United States Patent [19]

Woringer et al.

[11] Patent Number: 5,353,631
[45] Date of Patent: Oct. 11, 1994

[54] ANALYZING INTERNAL PRESSURE OF A SEALED CONTAINER USING FREQUENCY SPECTRA

[75] Inventors: Charles Woringer, Cataumet; John H. Waygan, Falmouth, both of Mass.

[73] Assignee: Benthos, Inc., North Falmouth, Mass.

[21] Appl. No.: 891,843

[22] Filed: May 29, 1992

[51] Int. Cl.$^5$ .............................. G01M 3/24
[52] U.S. Cl. ...................... 73/52; 73/45.4; 73/41; 73/49.3
[58] Field of Search .............. 73/52, 45.4, 41, 579, 73/602, 604, 659, 668, 49.3

[56] References Cited

U.S. PATENT DOCUMENTS

| | | | |
|---|---|---|---|
| 1,956,301 | 4/1934 | Richardson | 73/52 |
| 2,320,390 | 6/1943 | Shmurak | 73/52 |
| 3,290,922 | 12/1966 | Thompson | 73/52 |
| 3,416,360 | 12/1968 | Ochs | 73/52 |
| 3,441,132 | 4/1969 | Browning | 73/52 |
| 3,802,252 | 4/1974 | Hayward et al. | 73/52 |
| 4,096,738 | 6/1978 | Rupp et al. | 73/52 |
| 4,187,718 | 2/1980 | Shibasaki | 73/52 |
| 4,223,790 | 9/1980 | Yoshida | 209/590 |
| 4,406,157 | 9/1983 | Miyahara et al. | 73/52 |
| 5,144,838 | 9/1992 | Tsuboi | 73/579 |
| 5,161,521 | 11/1992 | Kasahara et al. | 73/579 |

FOREIGN PATENT DOCUMENTS

| | | | |
|---|---|---|---|
| 4004965 | 8/1991 | Fed. Rep. of Germany | G01M 3/40 |
| 3-156336 | of 1991 | Japan | G01M 3/36 |

OTHER PUBLICATIONS

*Canner Packer*, "Food Technology", Jan., 1972, p. 29 et al.
Kelsey, R., *Food and Drug Packaging*, Nov., 1990, p. 8.
Arthur D. Little Decision Resources, "Advances in Rapid Testing for Food–Industry Report", Jul. 12, 1990.

*Primary Examiner*—Richard E. Chilcot, Jr.
*Assistant Examiner*—Richard Moller
*Attorney, Agent, or Firm*—Fish & Richardson

[57] ABSTRACT

The internal pressure of a sealed container is characterized by tapping to vibrate a wall of the container, and then basing the characterization of the internal pressure on a frequency spectrum of the vibration and stored data measured from vibrating other sealed containers. The stored data is generated by vibrating a series of tests controllers having different, known internal pressures.

12 Claims, 27 Drawing Sheets

43 μs/ SAMPLE - 22.984 kHz 22.47Hz PER BIN

PEAK BIN = 1 FULL RANGE
FREQUENCY = 22.445 Hz

PEAK BIN = 1 QUADRANT 1
FREQUENCY = 22.445 Hz

PEAK BIN = 1 QUADRANT 2
FREQUENCY = 22.445 Hz

ANALYZING INTERNAL PRESSURE OF A SEALED CONTAINER USING FREQUENCY SPECTRA

BACKGROUND OF THE INVENTION

This invention relates to characterizing internal pressure of a sealed container.

Food and beverage containers, for example, are often sealed under vacuum (e.g., coffee) or internally pressurized (e.g., beer). If the seal fails, the food or beverage may spoil. Accordingly, manufacturers commonly test the containers for seal integrity before shipment. One known non-intrusive testing technique is shown in Hayward U.S. Pat. No. 3,802,252, assigned to Benthos, Inc., and incorporated herein by reference; systems of this type have been sold under the name TapTone. In the Hayward scheme a can is tapped causing vibration of the lid. A microphone picks up the vibration and generates ann electrical signal which is frequency filtered. If a signal peak is found in the filtered signal, the system infers that the can seal is good.

SUMMARY OF THE INVENTION

The invention uses a digitally stored frequency spectrum (signature) of the vibration generated by tapping a sealed container to characterize the internal pressure.

Thus, in general, in one aspect, the invention features apparatus for characterizing internal pressure of a series of sealed containers moving along a manufacturing line. A tapper causes vibration of a wall of the container. An analyzer derives a frequency spectrum of the vibration. Digital storage holds the frequency spectrum and holds data sufficient to characterize the internal pressure based on the frequency spectrum. The data is generated by a processor which includes means for controlling the tapper and the analyzer to generate frequency spectra for vibrations of a series of test containers having different, known internal pressures, and means for deriving the characterization data from the frequency spectra.

In general, in another aspect, a processor characterizes the internal pressure based on the frequency spectrum and the characterization data.

Embodiments of the invention include the following features. The processor includes means for characterizing the internal pressure based on more than one peak of the frequency spectrum. The data held in the digital storage includes frequency spectrum information corresponding to containers having different levels of internal pressure.

In general, in another aspect, a display shows a two-dimensional graphic image of the frequency spectrum.

In embodiments of the invention, the display comprises an LCD panel, and the graphic image comprises a bar graph.

In general, in another aspect, the invention features apparatus for characterizing internal pressure of a series of sealed containers moving along a manufacturing line. A tapper characterizes internal pressure of a sealed container when a predetermined part of the container reaches a predetermined point along the line. Circuitry determines when the predetermined part of the container reaches the predetermined point based on a determination of how long it took for a prior container in the series to pass the predetermined point.

Embodiments of the invention include the following features. The circuitry includes a sensor (e.g., a photosensor) for detecting a first time, when a predetermined part (e.g., the center) of the container first reaches the predetermined point, and a second time, when all portions of the container have passed the predetermined point. A processor determines the time difference between the first time and the second time. The processor averages the time difference with other time differences determined for other containers in the series.

The invention enables rapid, accurate determination of the seal integrity of cans and other containers. The user is able to view a graph of the frequency spectrum of the vibration of the container wall on a display, which aids set up of the system. The user can set up the system to test new container configurations without requiring extensive assistance by others. The system accurately determines when the container has reached the tapper position by watching how long it took for prior cans each to pass through the tapper position.

Other advantages and features will become apparent from the following description, and from the claims.

DESCRIPTION

Figure 6A:
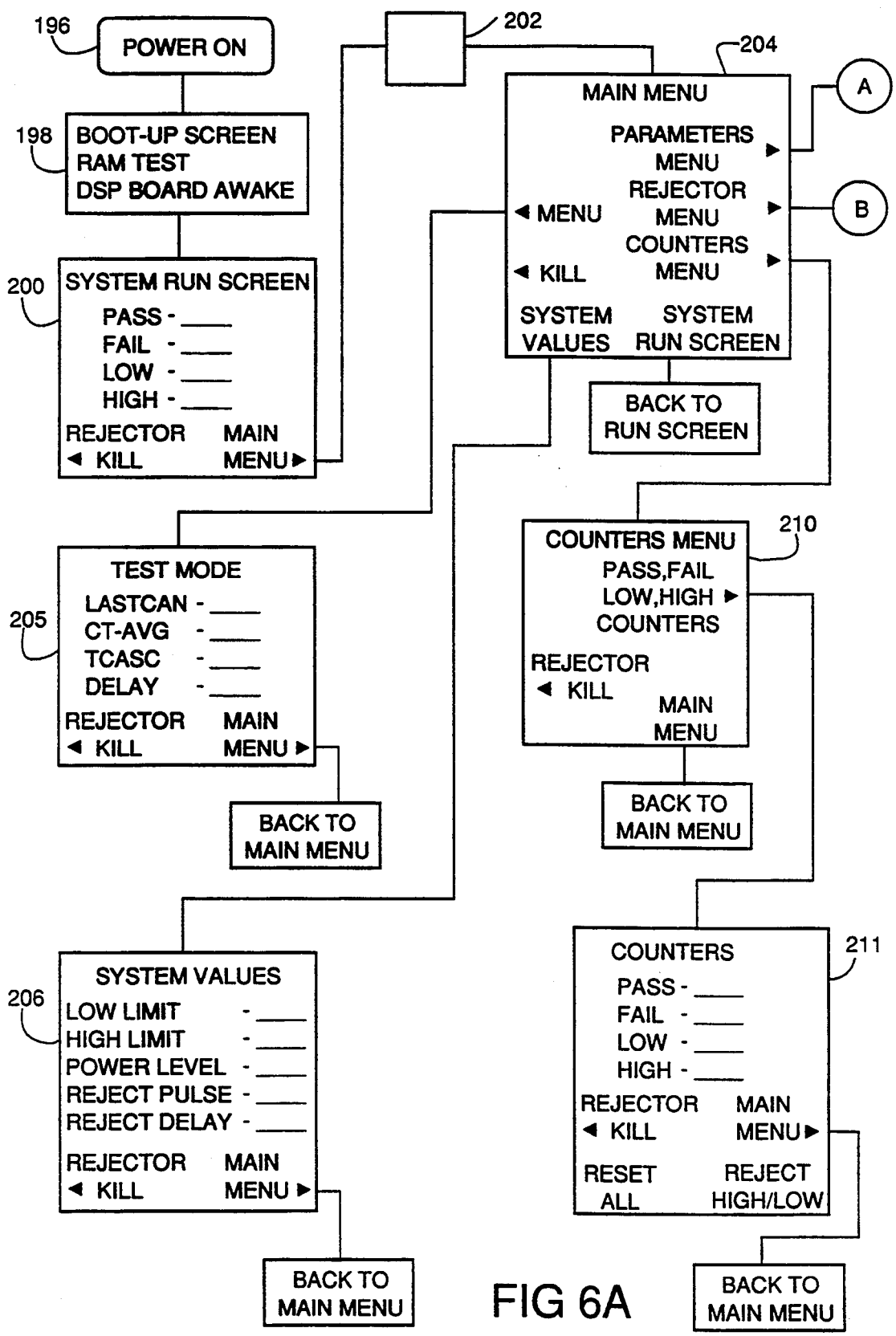
Figure 6B:
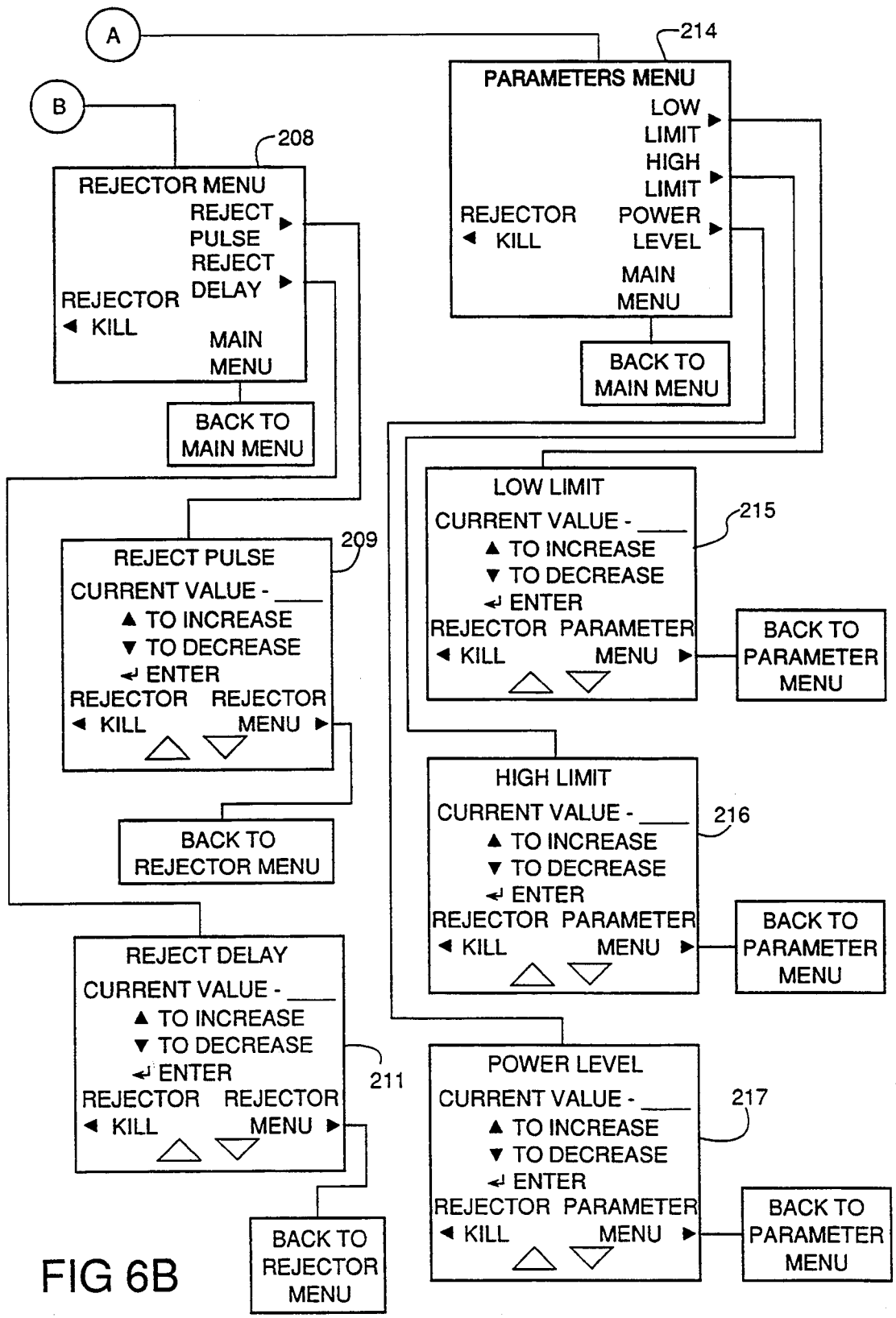
Figure 6C:
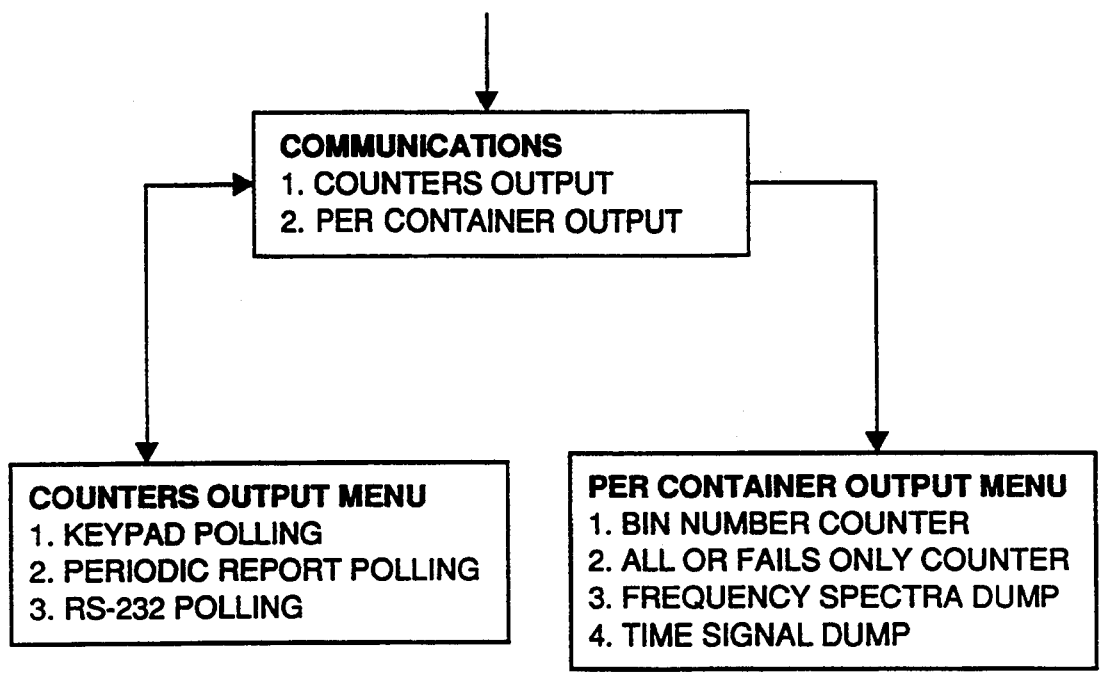
Figure 7A:
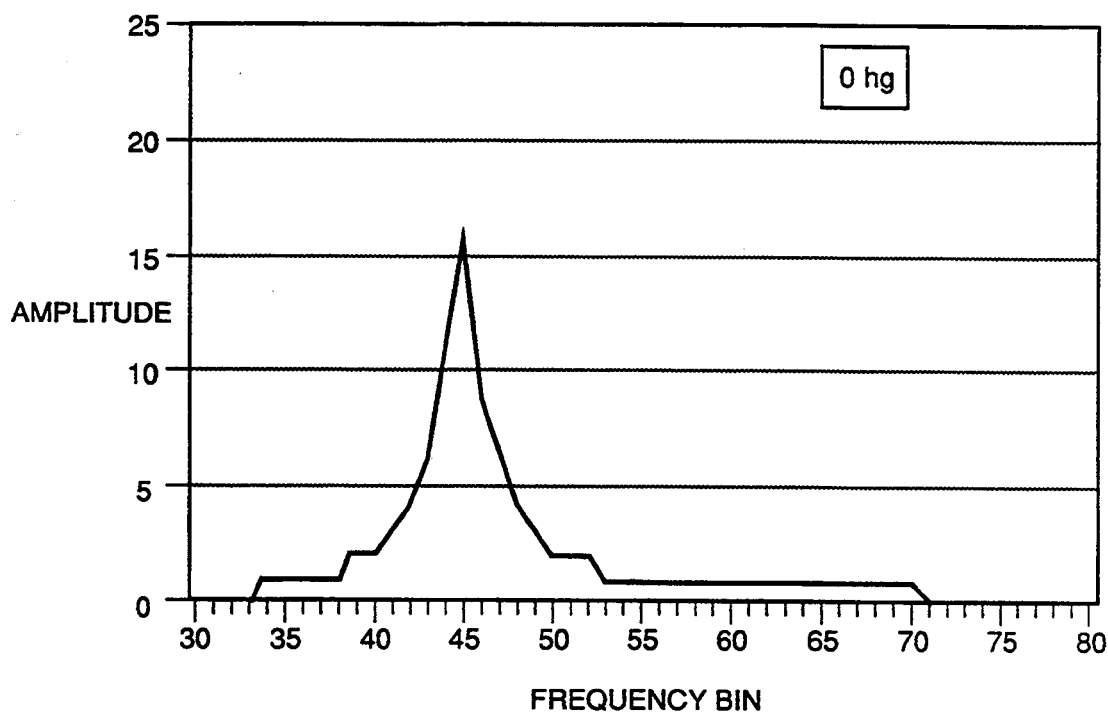
Figure 7B:
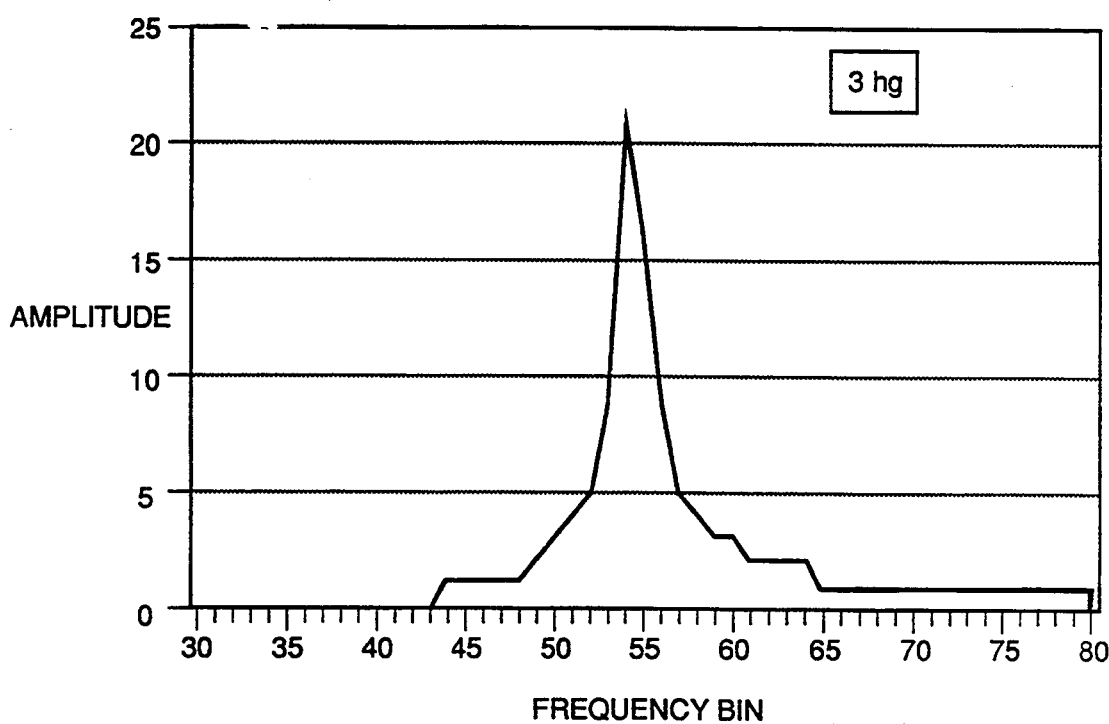
Figure 7C:
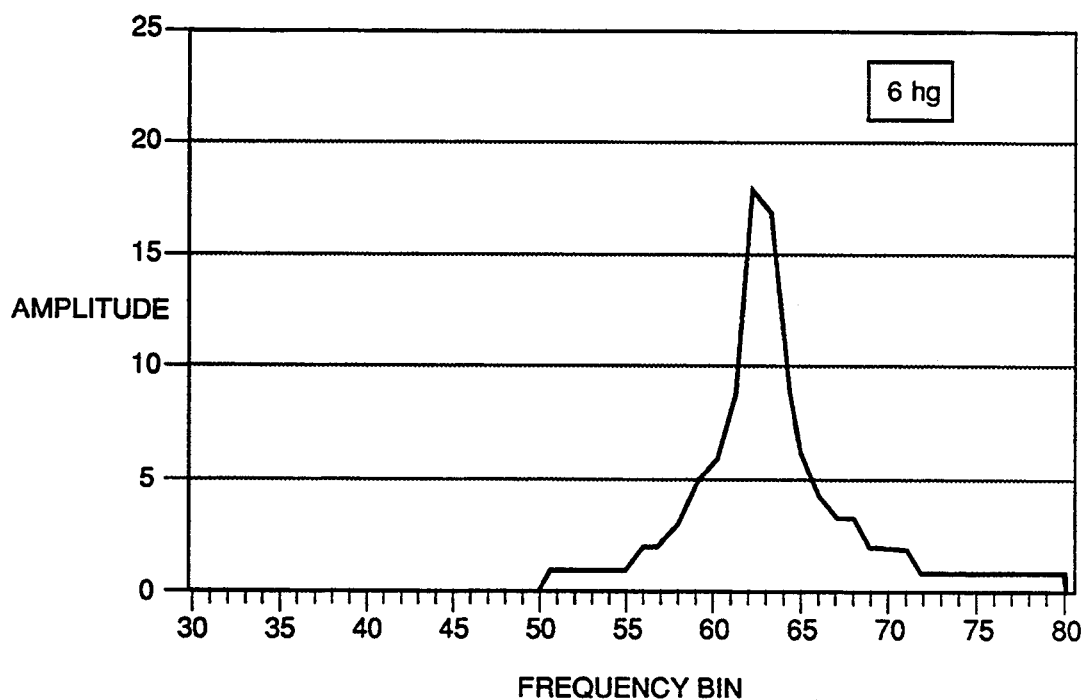
Figure 7D:
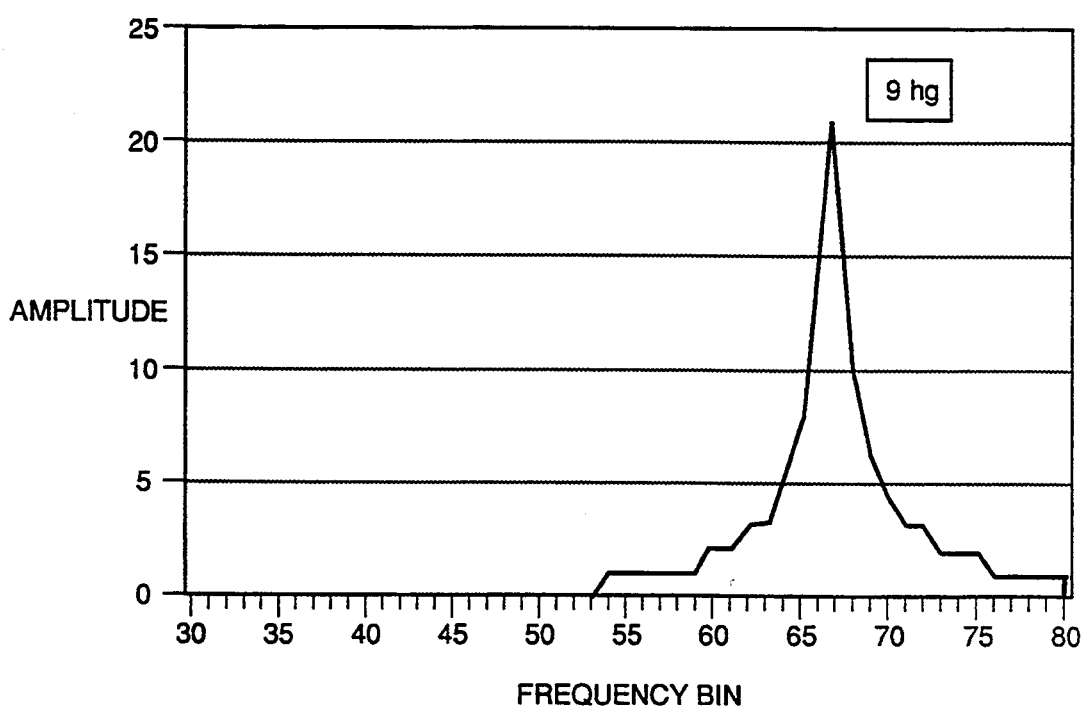
Figure 7E:
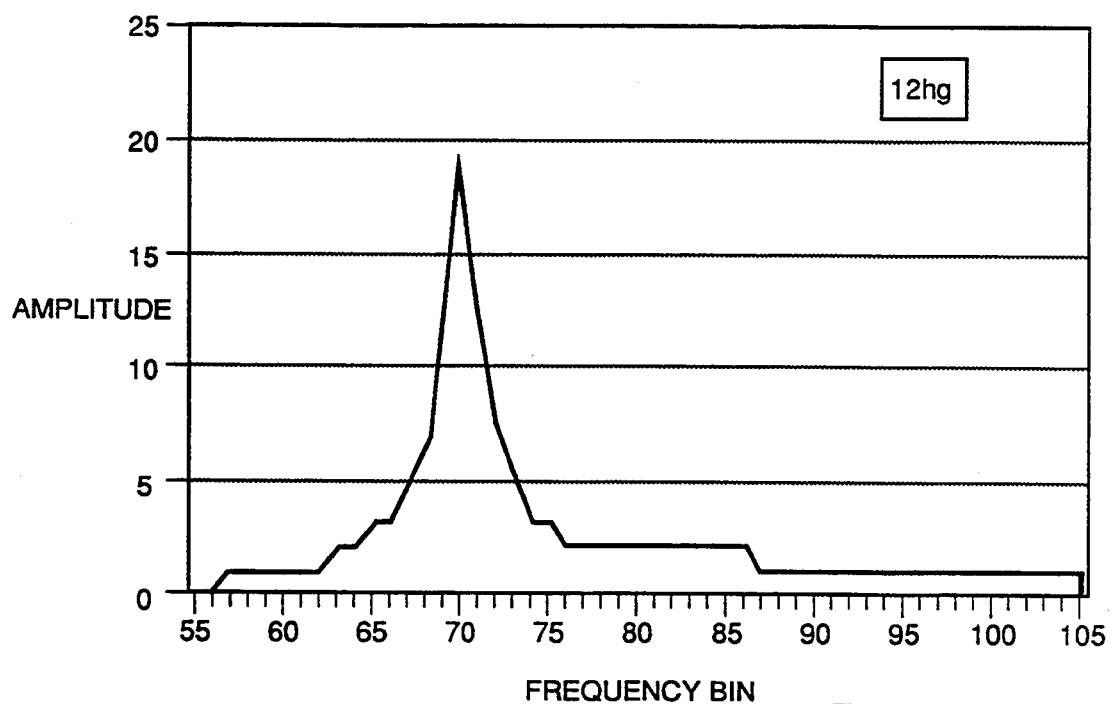
Figure 7F:
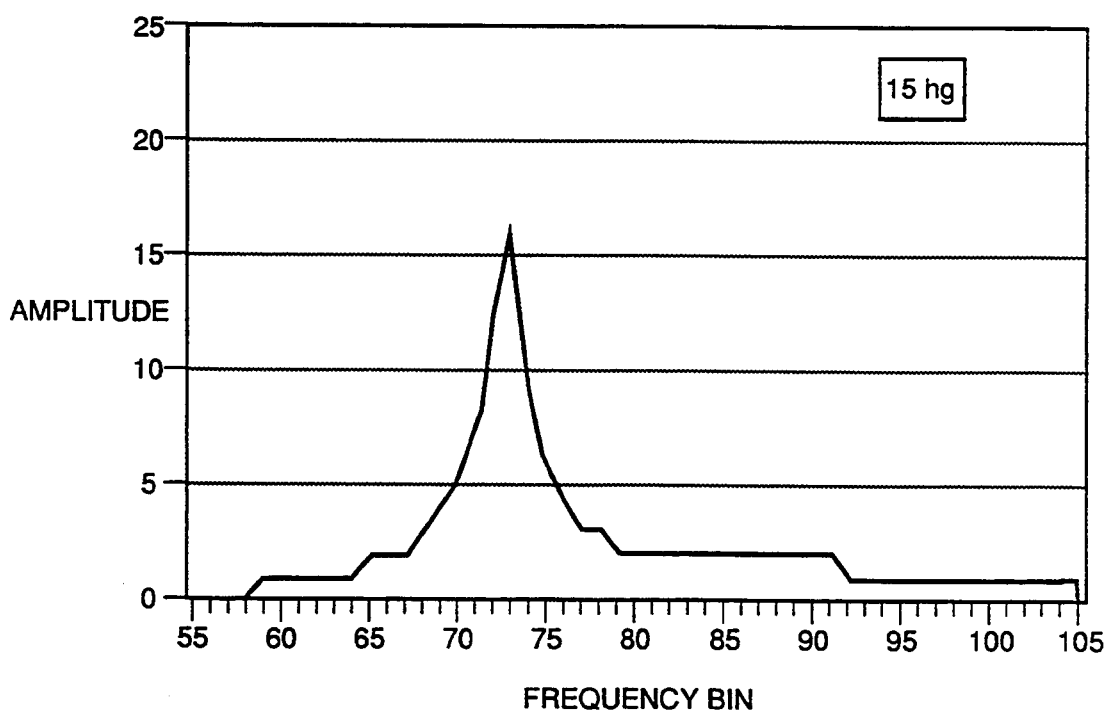

FIGS. 6A, 6B, and 6C are charts of user menus.

FIGS. 7(a)-7(f) are frequency domain graphs at different internal pressures.

FIGS. 8(a)-8(b), 9(a)-9(b), 10(a)-10(b) are graphs in the time and frequency domains.

Figure 11:
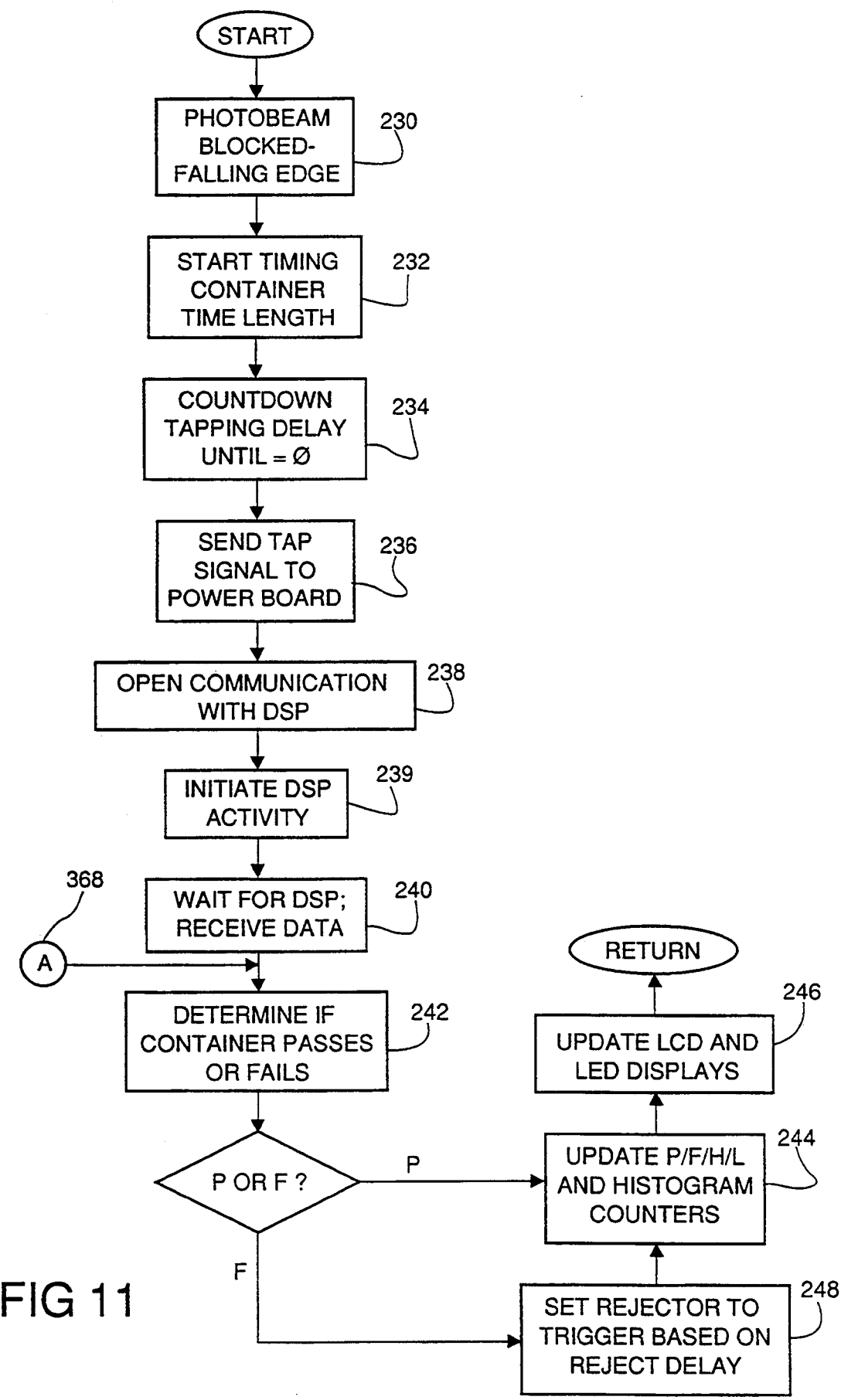
Figure 12:
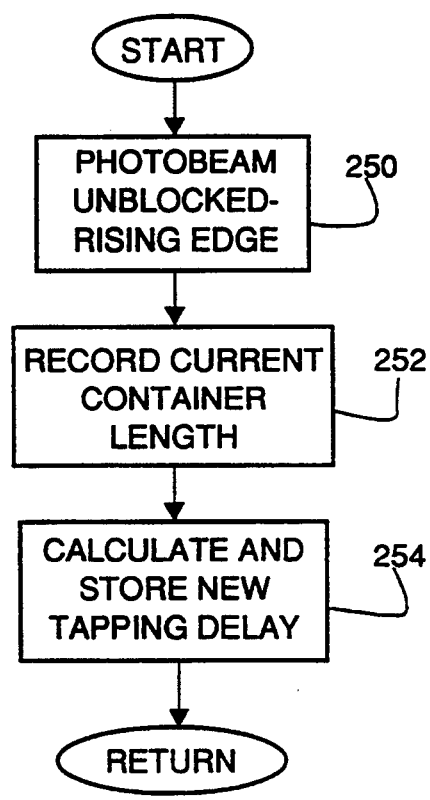

FIGS. 11 and 12 are flowcharts of controller programs.

Figure 13:
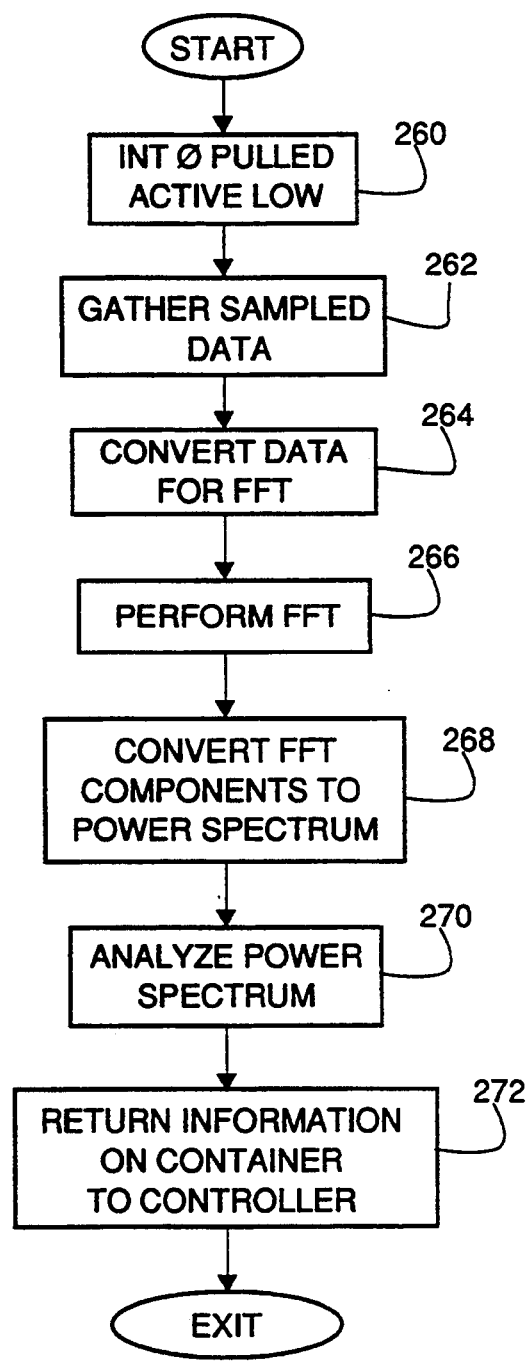

FIG. 13 is a flowchart of data gathering and analysis by the digital signal processor.

Figure 14:
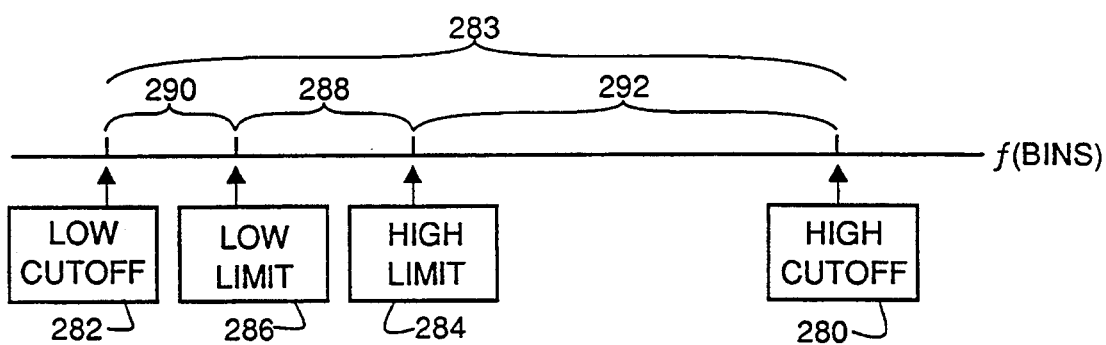

FIG. 14 is a diagram of frequency ranges used for container testing.

Figure 15:
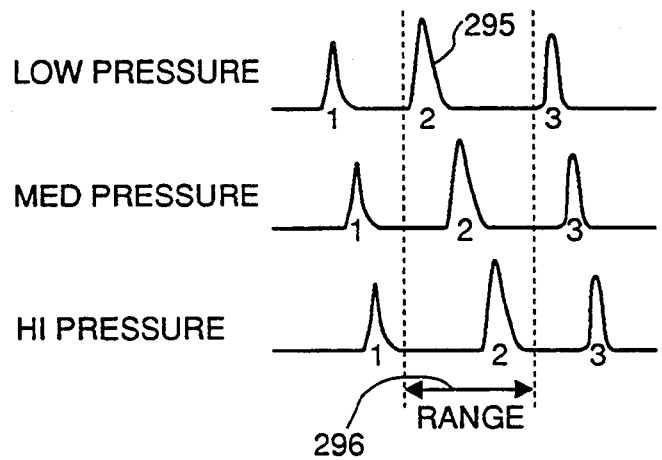
Figure 16:
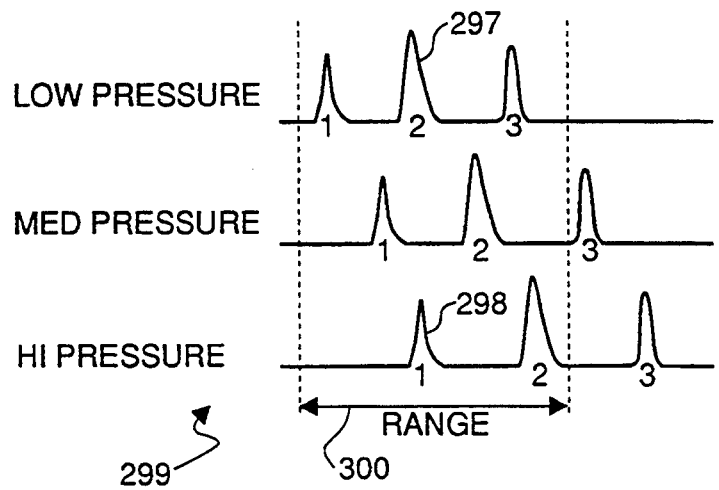
Figure 17:
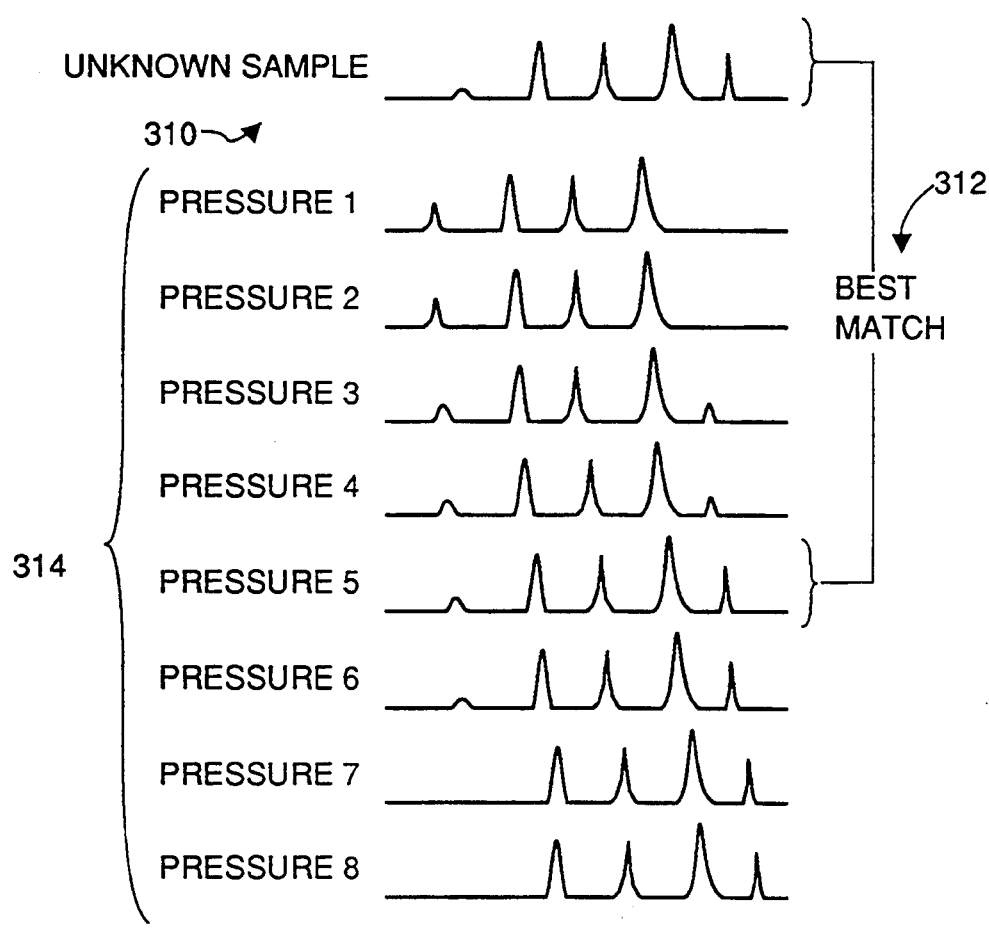

FIGS. 15-17 are graphs of signatures.

Figure 18:
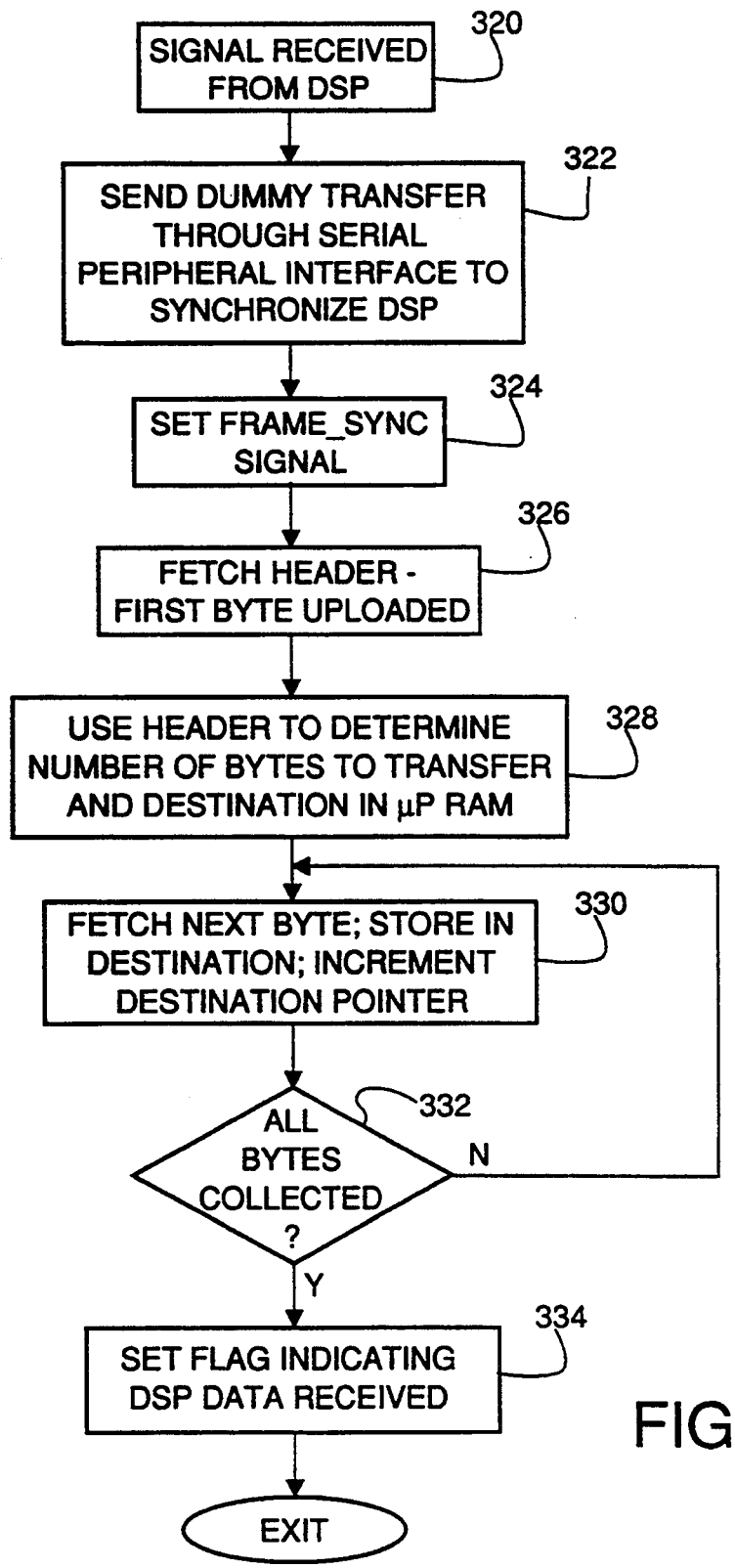

FIG. 18 is a flowchart showing data transfer from the digital signal processor to the controller.

Figure 19:
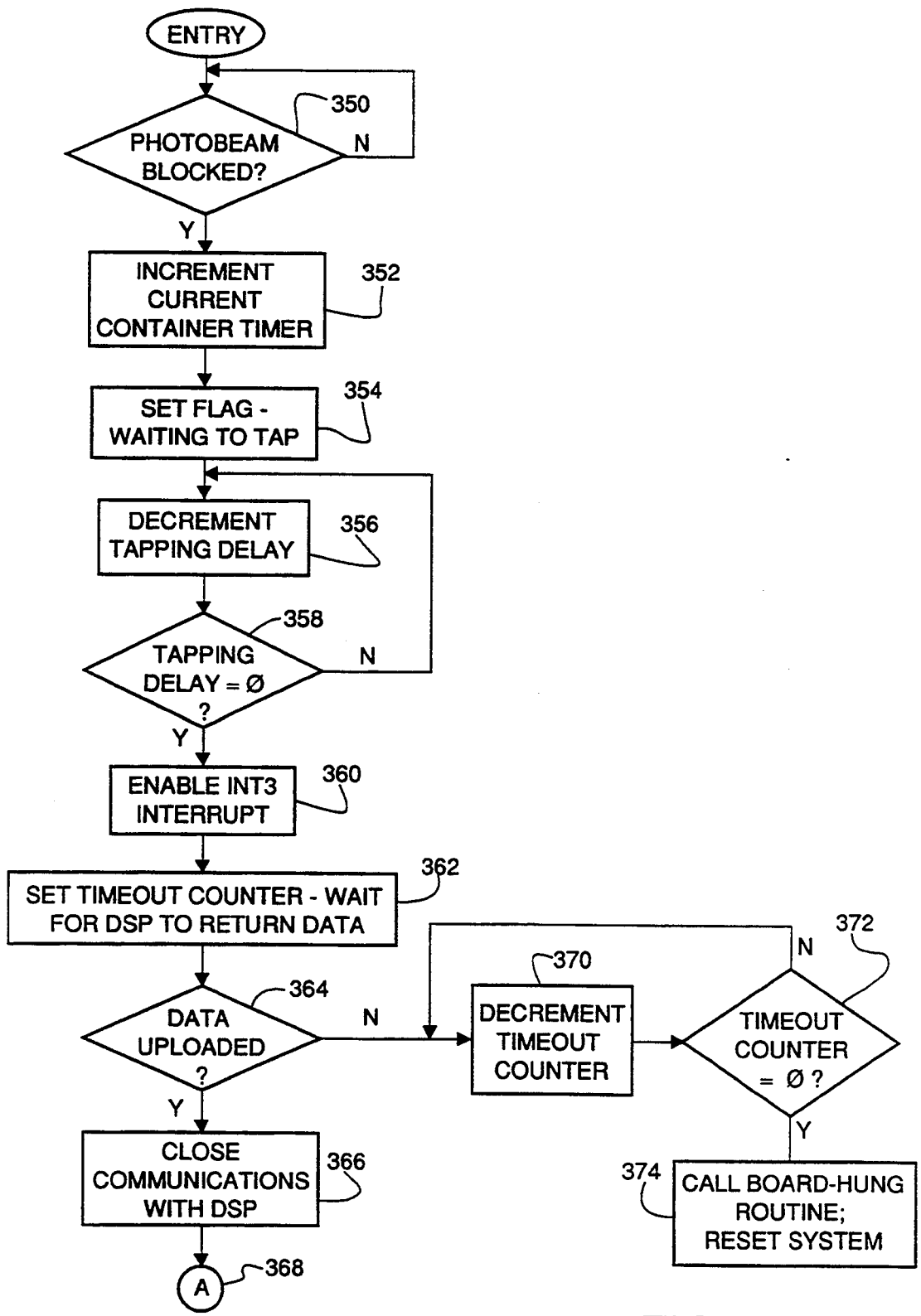
Figure 20:
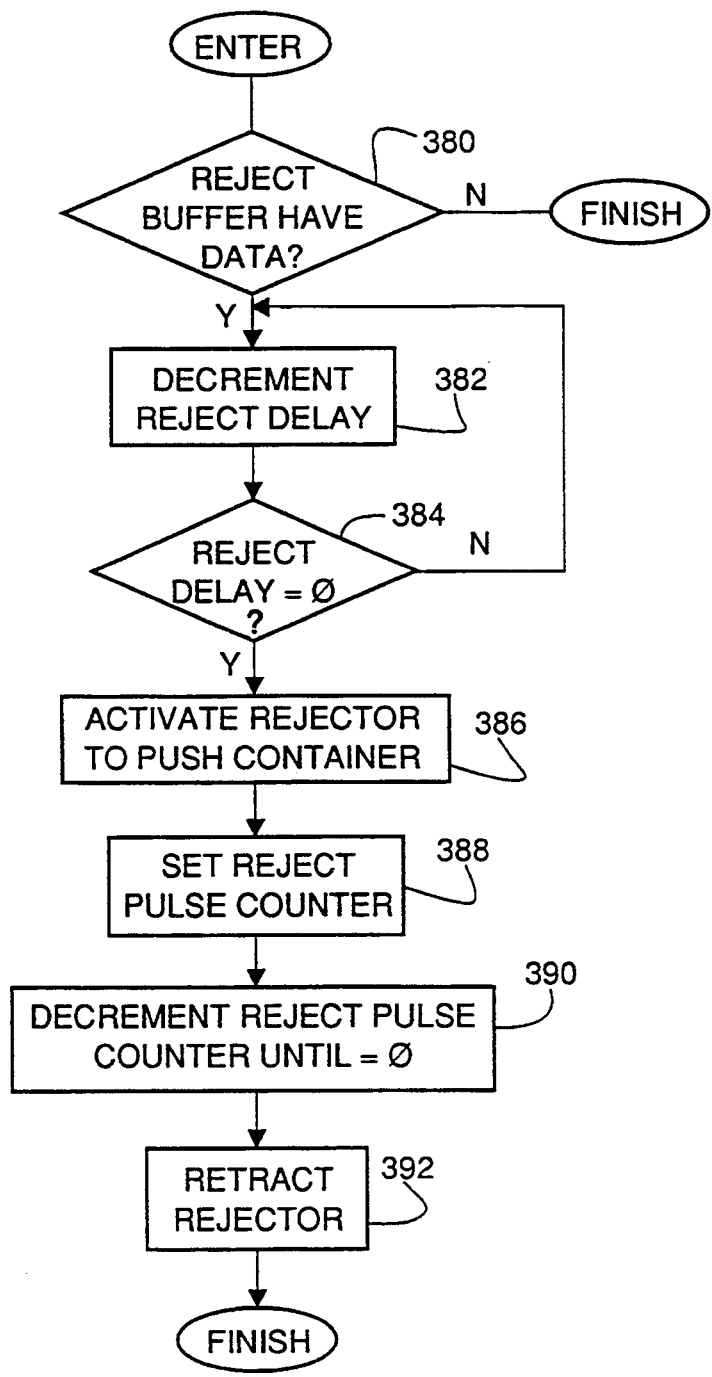

FIGS. 19 and 20 are flowcharts of timed functions performed by the controller.

Figure 21:
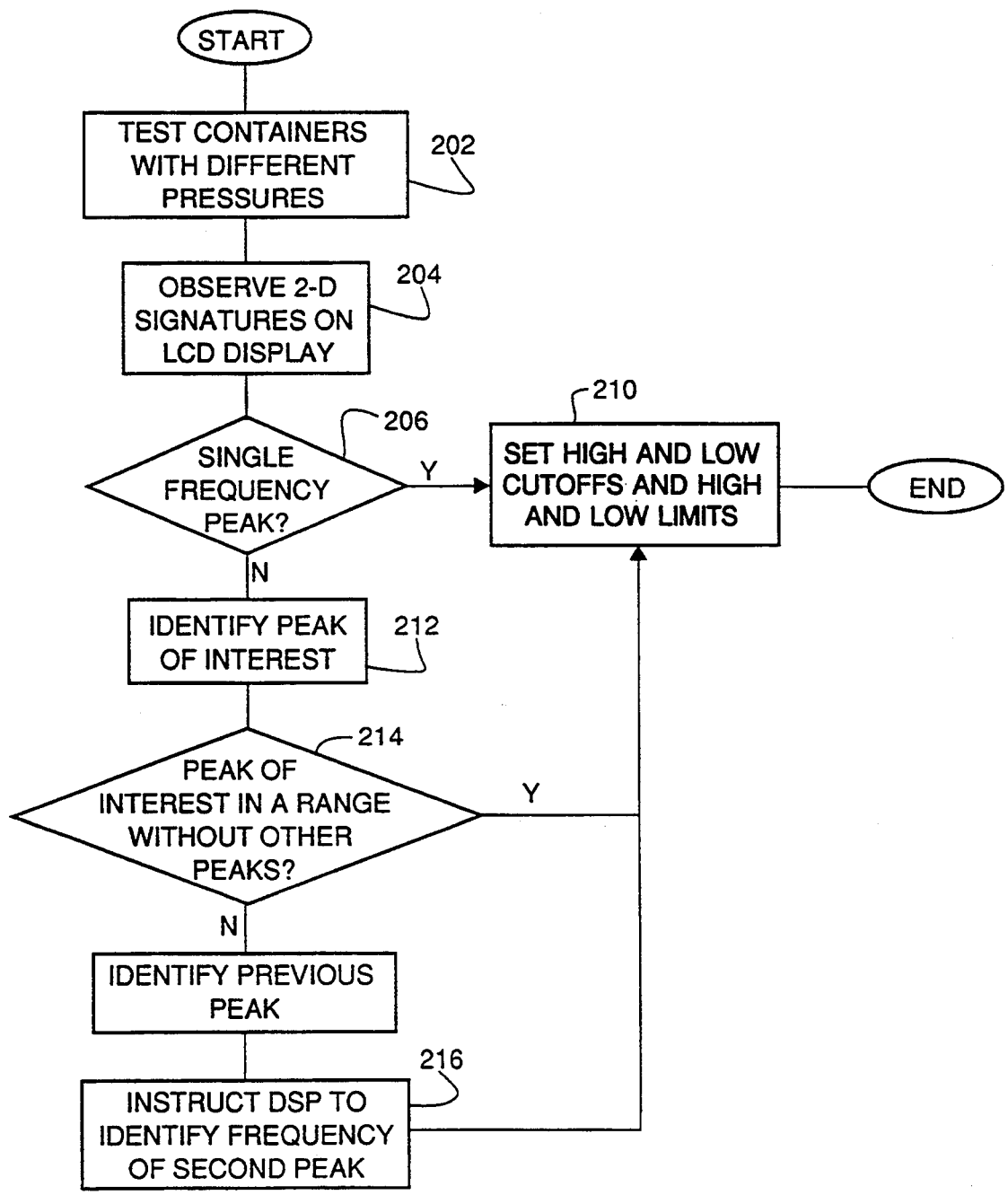
Figure 22:
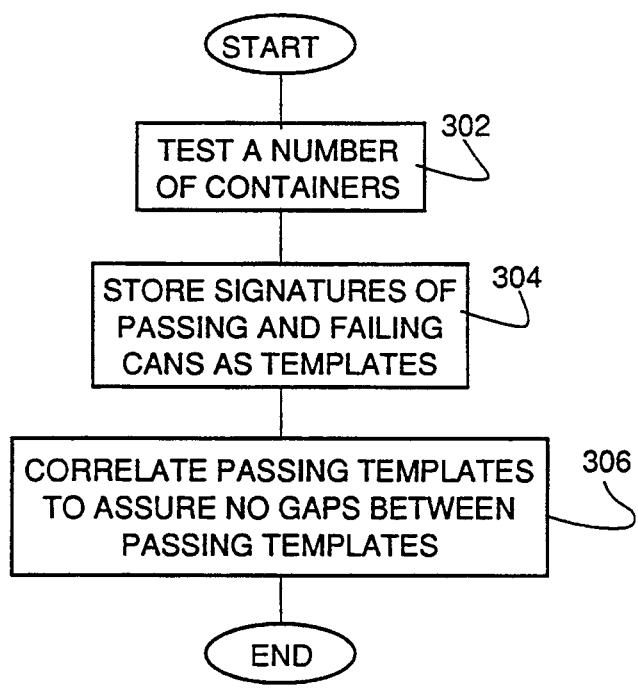

FIGS. 21 and 22 are flowcharts of set up procedures.

Figure 23:
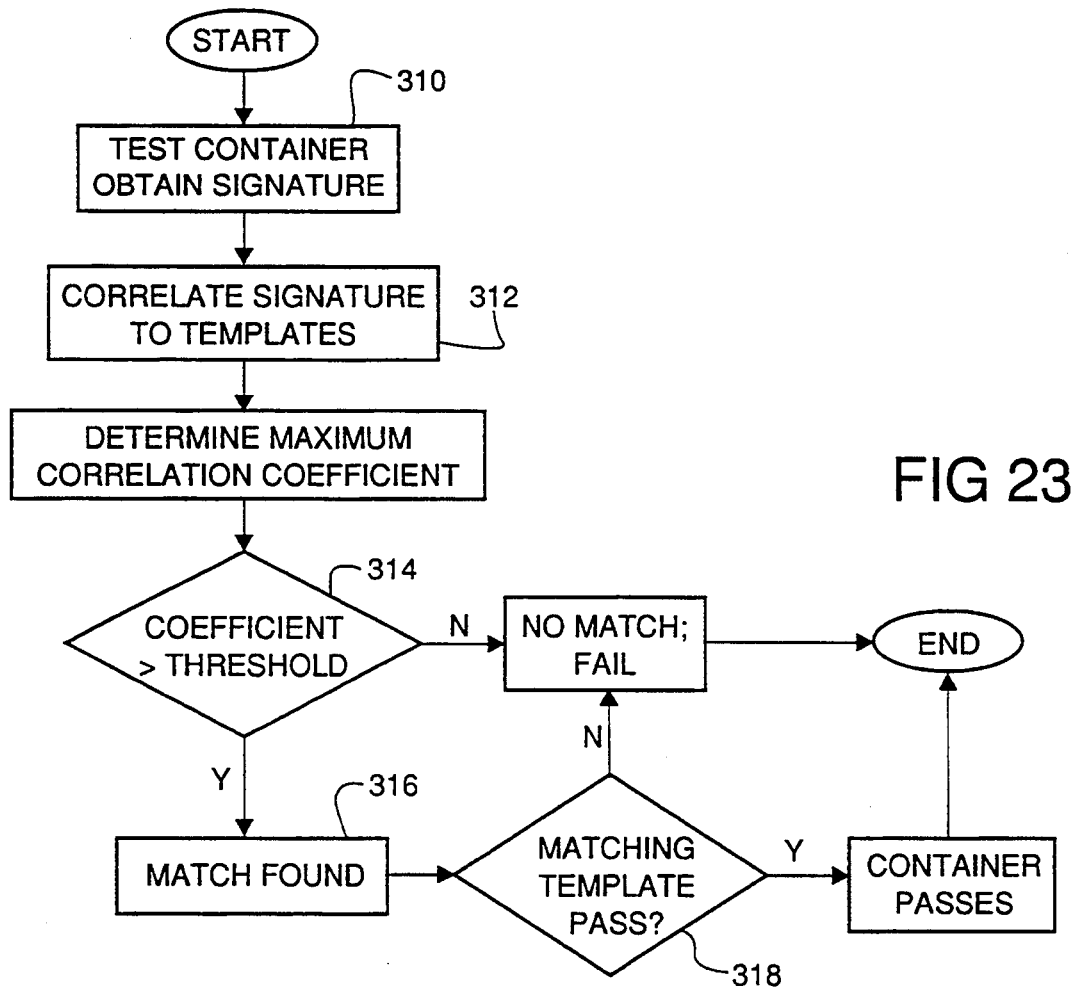

FIG. 23 is a flowchart of a test procedure.

Figure 24:
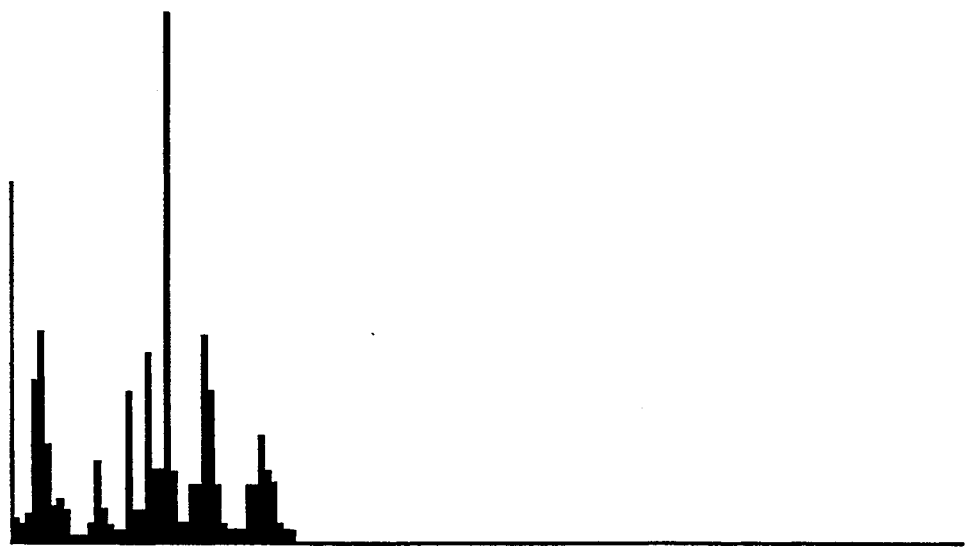
Figure 25:
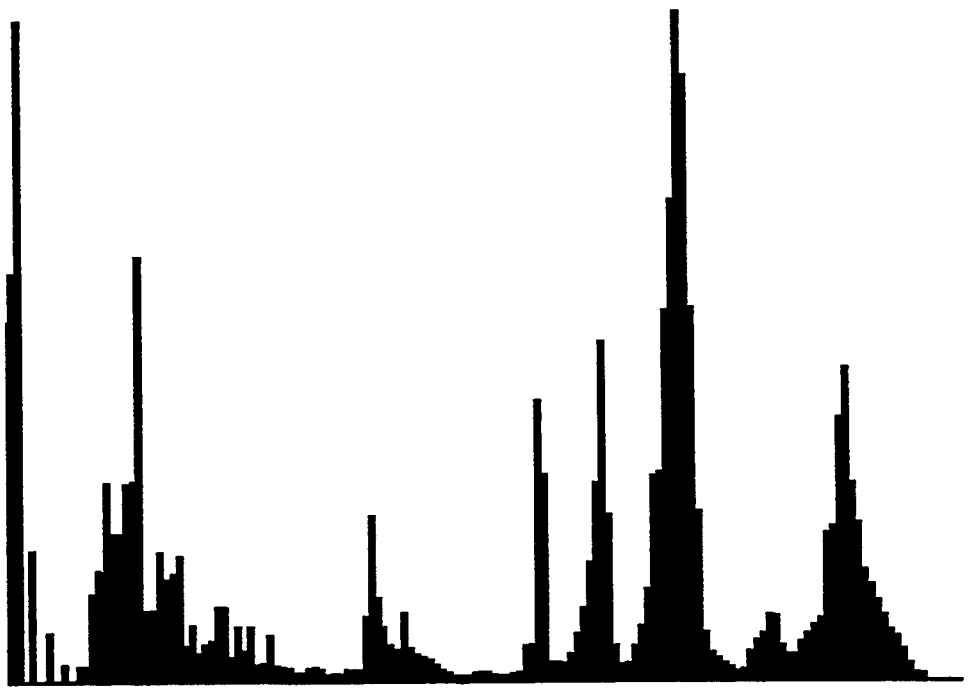
Figure 26:

FIGS. 24-26 are LCD images of frequency spectra.

Figure 27:
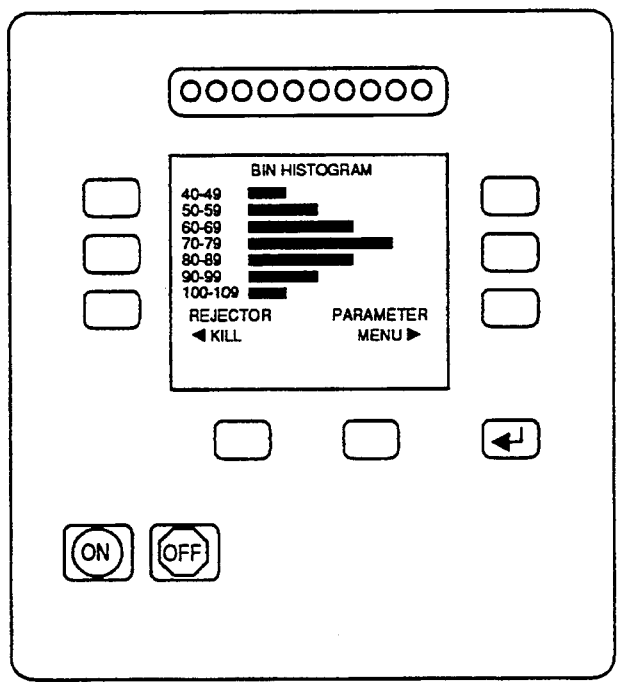
Figure 28:
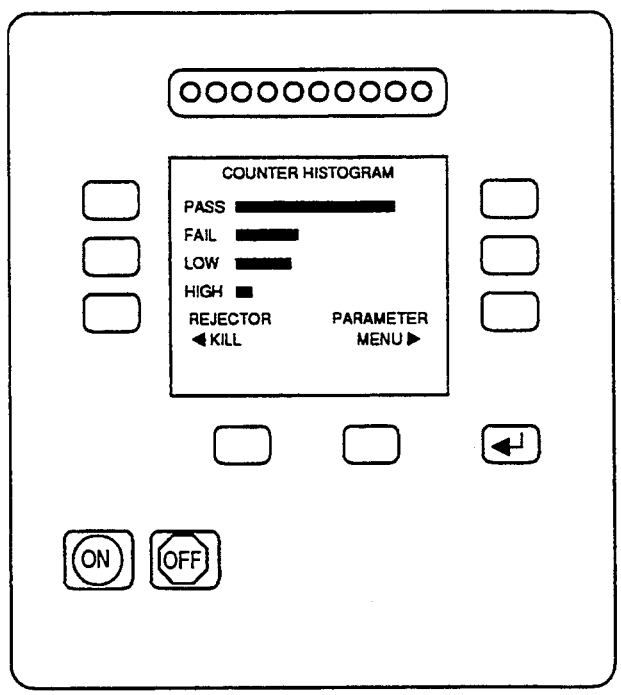

FIGS. 27 and 28 show images of the user control panel.

Figure 1:
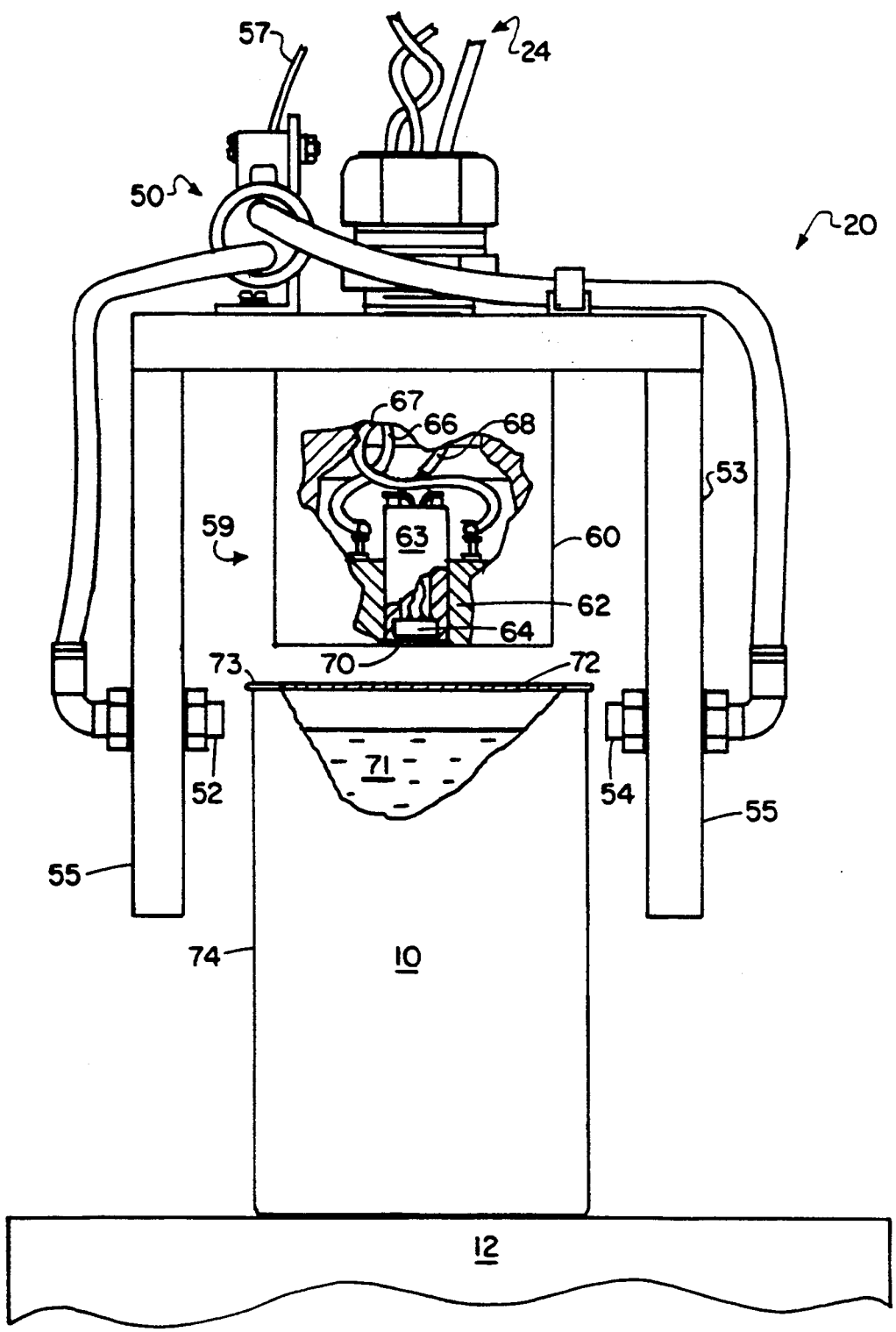
FIG. 1 is a side view partly broken away of a tapper.

Referring to FIG. 1, sealed can (container) 10, holds, e.g., a carbonated beverage 71 under pressure. Container 10 includes a lid 72 attached to a cylindrical side wall 74 along a seal 73. The amount of internal pressure on the contents of the container may vary with the type of product in the container, and the size and type of container, which may be, for example, a can, bottle, bag, retort pouch, or box. Container 10 is carried rapidly along a manufacturing line by a conveyor 12 along with a series of other containers. Each container in turn reaches a tapper station 20.

Tapper station 20 includes a transducer assembly 59 positioned above, and near to lid 72 of the container. Assembly 59 has a housing 60 held on a support 53. An annular transducer coil 62 is mounted in the lower portion of the housing. A microphone assembly 63 is held at the bottom center of the housing and includes a microphone 64 positioned close to the bottom surface of the housing. Microphone 64 is positioned about 1/16 inch from a waterproof membrane 70 which extends across a lower open portion of microphone assembly 63. Membrane 70 is, for example, a layer of silicone rubber about 0.01 inches thick. The membrane protects the microphone from contaminating liquids and washdown fluids that are used to clean the manufacturing line. Leads 66–68 connect coil 62 and microphone 64 to a controller (not shown in FIG. 1).

Coil 62 is powered under control of the controller to provide a brief electromagnetic pulse, known as a "tap", to lid 72, causing it to vibrate. The frequency characteristics of this vibration are a function of several parameters, including the pressure difference across the lid. When the lid vibrates, it causes pressure variations which create an acoustical signal. The acoustical signal is received by microphone 64 which provides a corresponding time-varying analog signal over line 68 to the controller. The controller digitizes the signal, stores it, transforms the digital signal to a frequency domain signature, and stores the signature digitally. The signature, which is related to the pressure in the container, is analyzed digitally to determine if the container is properly sealed.

Figure 8A:
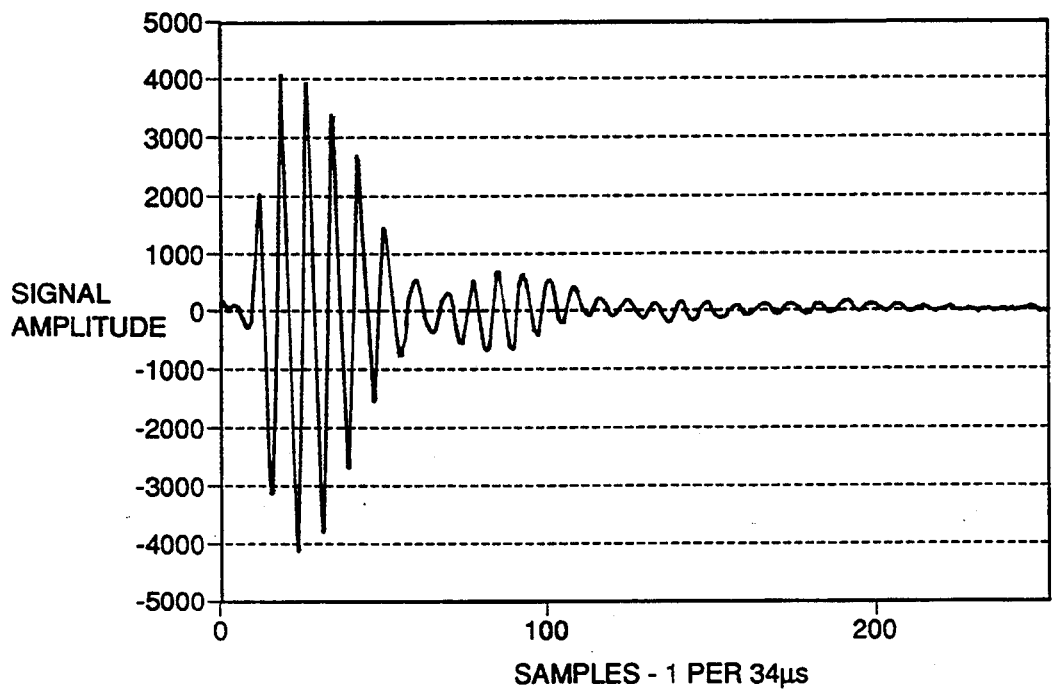
Figure 8B:
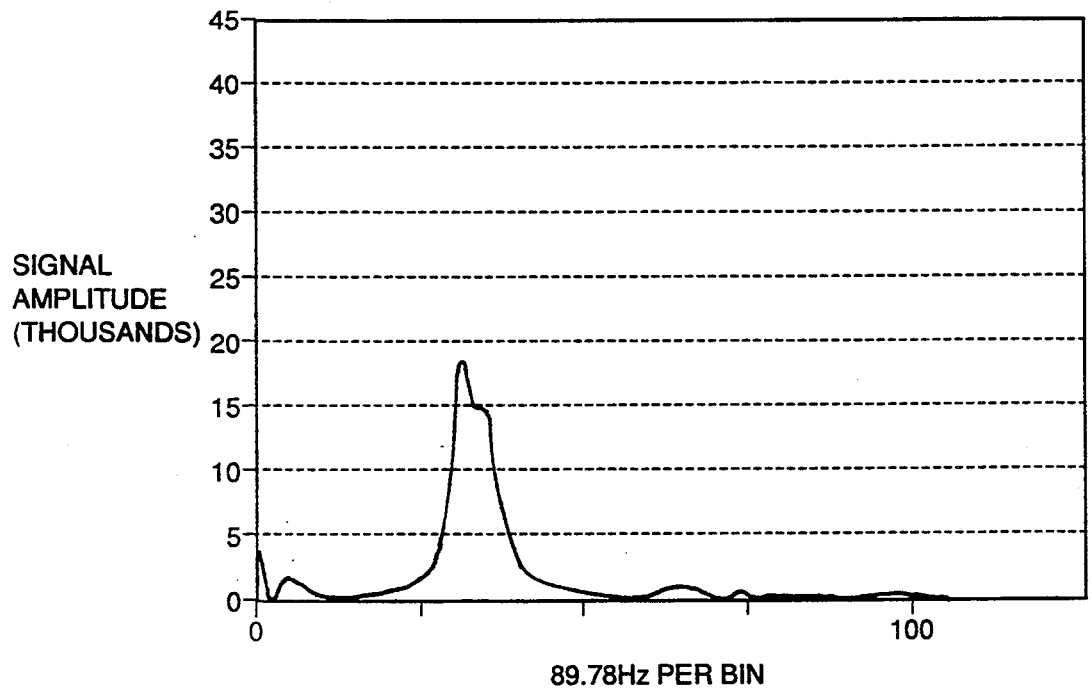
Figure 9A:
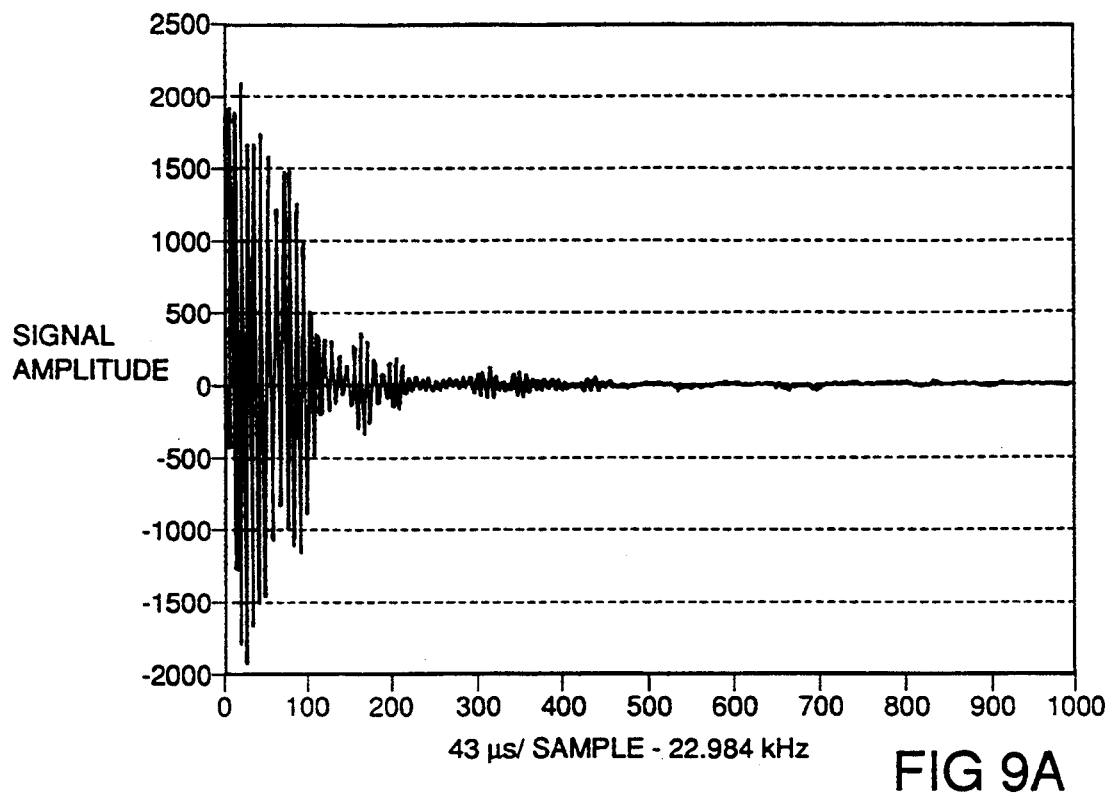
Figure 9B:
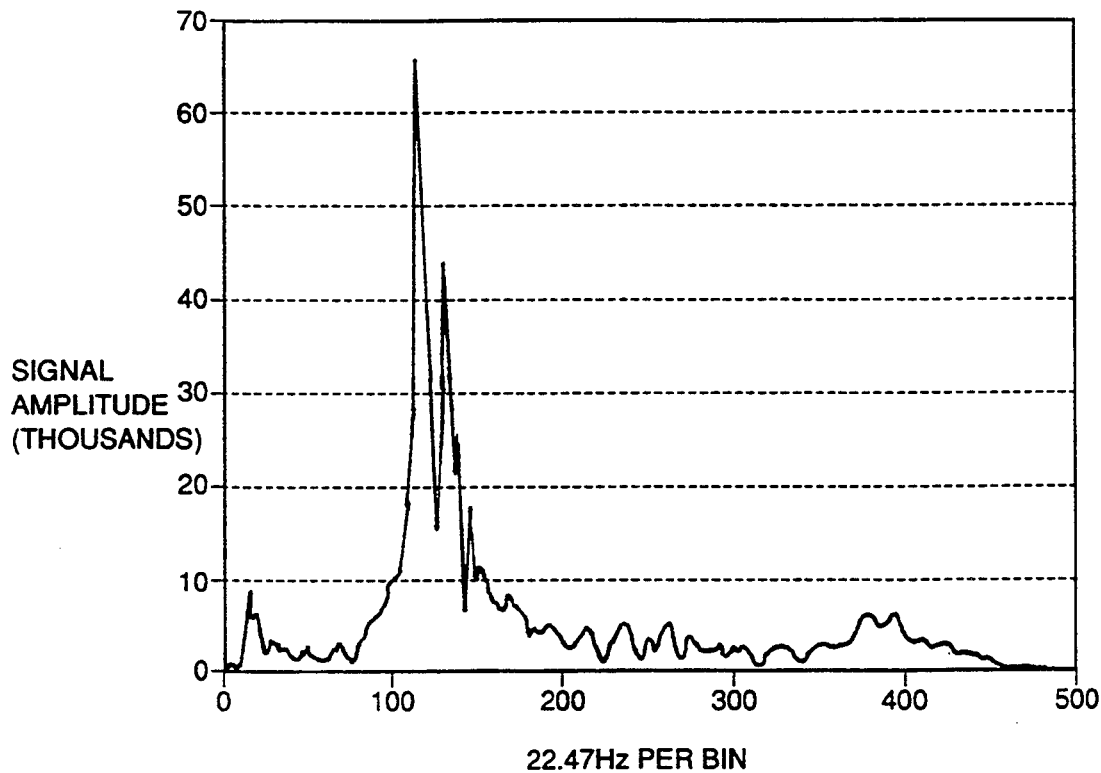
Figure 10A:
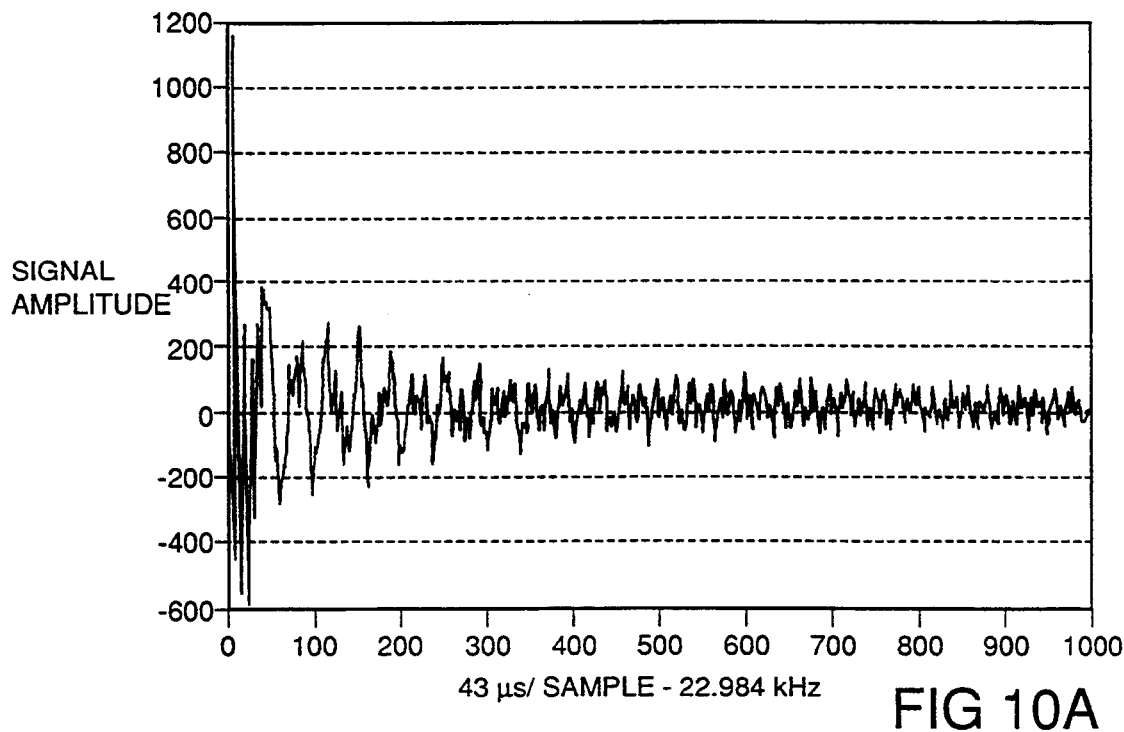
Figure 10B:
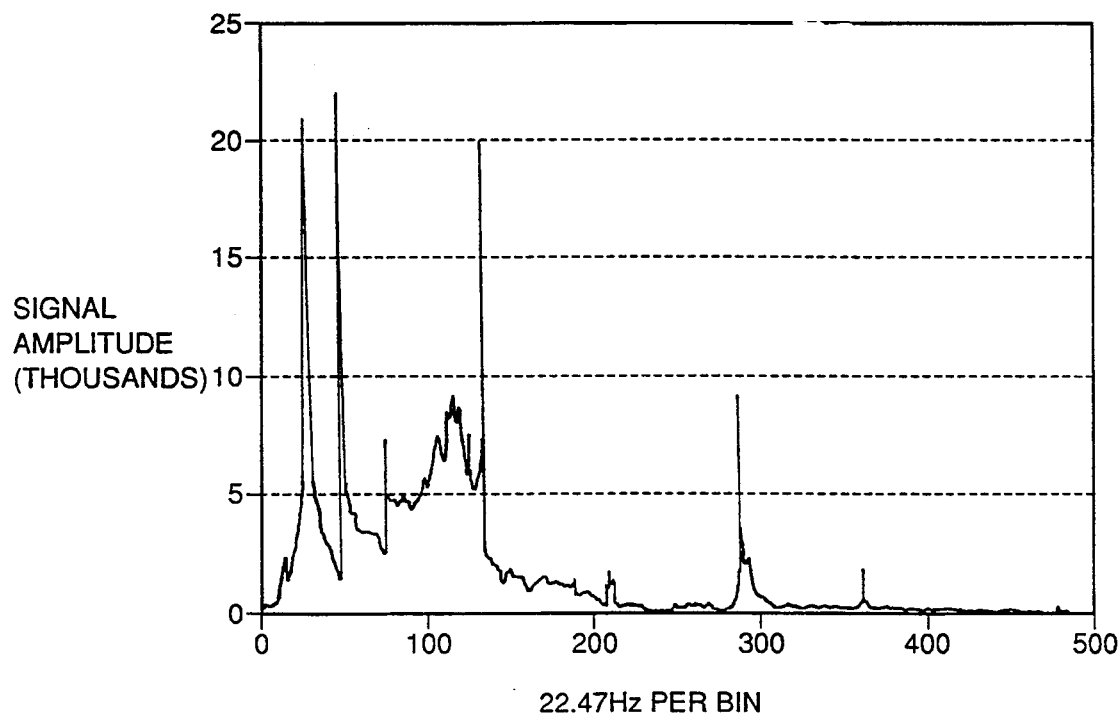

Referring to FIGS. 7(a)–7(f), signatures are shown for a vacuum-packed food product, such as a container of nuts, over a range of different vacuums from 0 to 15 mm of mercury (hg). As the vacuum is stepped in intervals of 3 hg, a single dominant frequency peak shifts non-linearly from the 45th bin to the 73rd bin. (Each bin represents approximately 22 Hz). In FIGS. 8(a), 9(a), and 10(a), the time domain signals resulting from the lid vibrations trail off over time and contain "hidden" frequency domain information which is captured in the frequency domain signatures of FIGS. 8(b), 9(b), and 10(b). Note that while FIG. 8(b) also has a single frequency peak, FIGS. 9(b) and 10(b) show signatures from other types of sealed containers which produce signatures with two peaks and many peaks, respectively. The frequency signatures thus provide a large amount of information about the vibrational characteristics of a given container, under a particular pressure differential, and with a particular product contained in it. By storing the full frequency signature it is possible to perform sophisticated and complex analyses of the signature of a container being tested relative to signatures of like containers having good and bad seals. In this way the system can quickly and easily accommodate new product lines, and can produce highly accurate test results.

Figure 2:
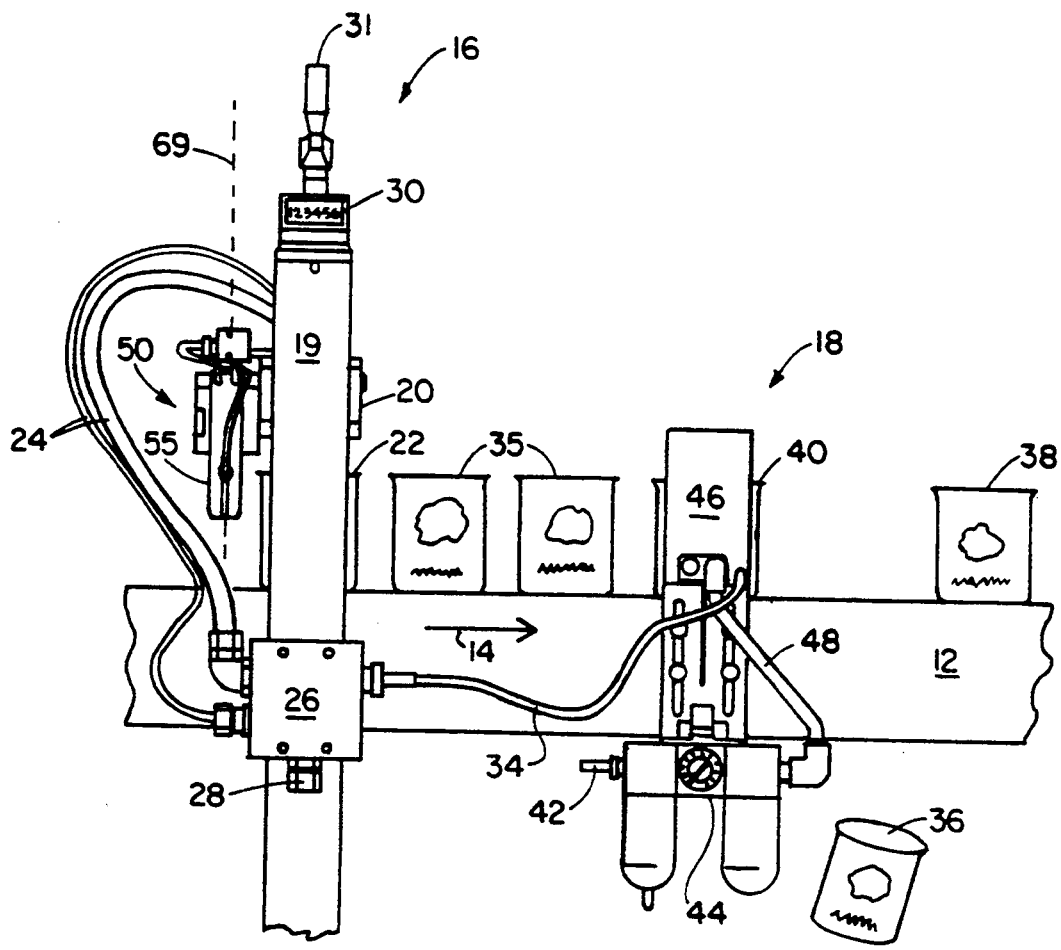
FIGS. 2 and 3 are side and end views, respectively, of a container testing system.

Referring again to FIG. 1, a photobeam assembly 50, mounted on support 55, has an LED light source 54 and a light detector 52 held in holes in two opposite support walls 55. The support walls 55 are far enough apart to allow the container to pass, and have other holes vertically arranged so that the source and detector can be positioned at other heights relative to the conveyor 12 for different container heights. Referring to FIG. 2, the location of the light source and light detector define a test position 69 along the length of the conveyor. The container should be centered at position 69 at the time the tapper is triggered. The light source and light detector and controller are coordinated to assure that each container occupies the proper position when the lid is tapped.

As each container moves on the conveyor, it approaches the light beam. The photobeam assembly provides a high signal when the beam is received by the detector, and a low signal when the beam is interrupted.

When the container interrupts the light beam between source 54 and detector 52, the signal sent to the controller over cable 57 drops low, causing the controller to provide a signal to the coil to tap the container after a predetermined tapping delay.

The controller automatically determines when the approximate center of the container has reached the tapping position, without requiring any manual adjustment for a new product or new line speed. The determination also adapts automatically to variations in the line speed. The controller determines how long a typical container interrupts the beam as it is passing along the conveyor. For each container appearing on the conveyor, when any portion of the container first interrupts the light beam, the controller records the time when the interruption occurs. Later the controller records the time when all parts of the container have passed beyond the light beam and the beam is reestablished. The controller then determines the time difference and stores it as an indication of how long it takes a container to pass through the beam. As subsequent containers pass through the beam, the same measurement is made and a stored value is updated to reflect an average of the time differences for successive containers. The computation is done using an infinite impulse response filter. Thus, if the product or line speed is changed, the controller slowly adjusts the stored averaged time difference value accordingly. The predetermined tapping delay is computed as half of the stored average time difference in the case of a cylindrical container. Since the light beam is positioned under and centered with the coil, the measurement is less affected by line speed than if it were offset by some distance.

Referring again to FIG. 2, horizontal conveyor 12 moves containers 35 in the direction of arrow 14 at a high rate of speed (e.g., up to 3,000 containers per minute). Each container first reaches testing station 16 which is a combination of photobeam assembly 50 and transducer assembly 59. Station 16 has a vertical support 19 which is positioned next to the conveyor. At the top of the vertical support is a handle 31 for adjusting the height of support 19, and in turn, distance between the tapper and the conveyor. Digital counter 31 displays the relative height value of the support. A motorized system can be attached to the vertical support, so that, if a different product is substituted, the appropriate height can be recalled from memory if the product had been previously tested.

Signals to and from tapper 20, including those on leads 66–68 which are coupled to the coil and microphone (FIG. 1), are carried by cables 24 to junction box 26 which is coupled to the controller.

If the controller determines that a container is not properly sealed, it sends a rejection signal on cable 34 to rejector assembly 18 which is positioned several feet from testing station 16. The rejector is a pneumatically driven device which receives compressed air at input port 42. Valve 44 receives the pressurized air and in turn drives actuator 46 via line 48. Actuator 46 has a piston with a bumper (not shown) which is positioned next to conveyor 12 to push improperly sealed containers 36 off the conveyor. Properly sealed containers 38 remain on the conveyor.

Figure 3:
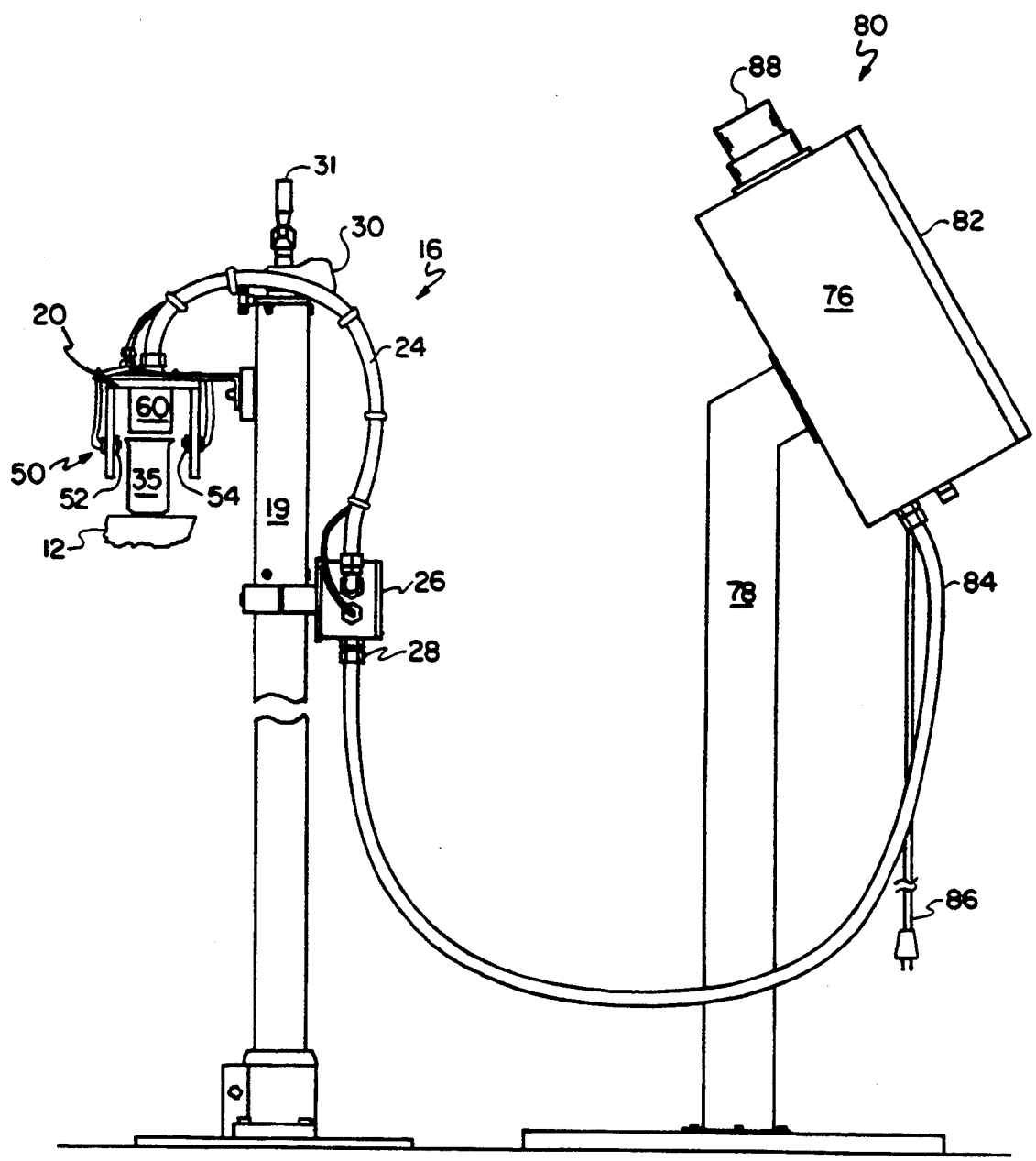

Referring to FIG. 3, testing assembly 16 is controlled and monitored by a user at a console 80. Console 80 has a console box 76 which is mounted on vertical stand 78. Cable 84 couples the controller, which is in console box 76, to junction box 26, and from junction box 26 to tapper 20 and rejector 18. Front surface 82 of console box 76 has controls and indicators positioned at a height for convenient access and observation by a user. At the top of console box 76 is a lamp 88 which is lit to notify the user when a container has been rejected. Power is provided by AC plug 86.

The testing station, rejector, and console are made primarily of stainless steel and plastic to withstand washdown periods. During these periods, the equipment is cleaned and sterilized with pressurized steam. The microphone is protected during washdown by the waterproof membrane 70 positioned over channel 65 (FIG. 1).

Figure 4:
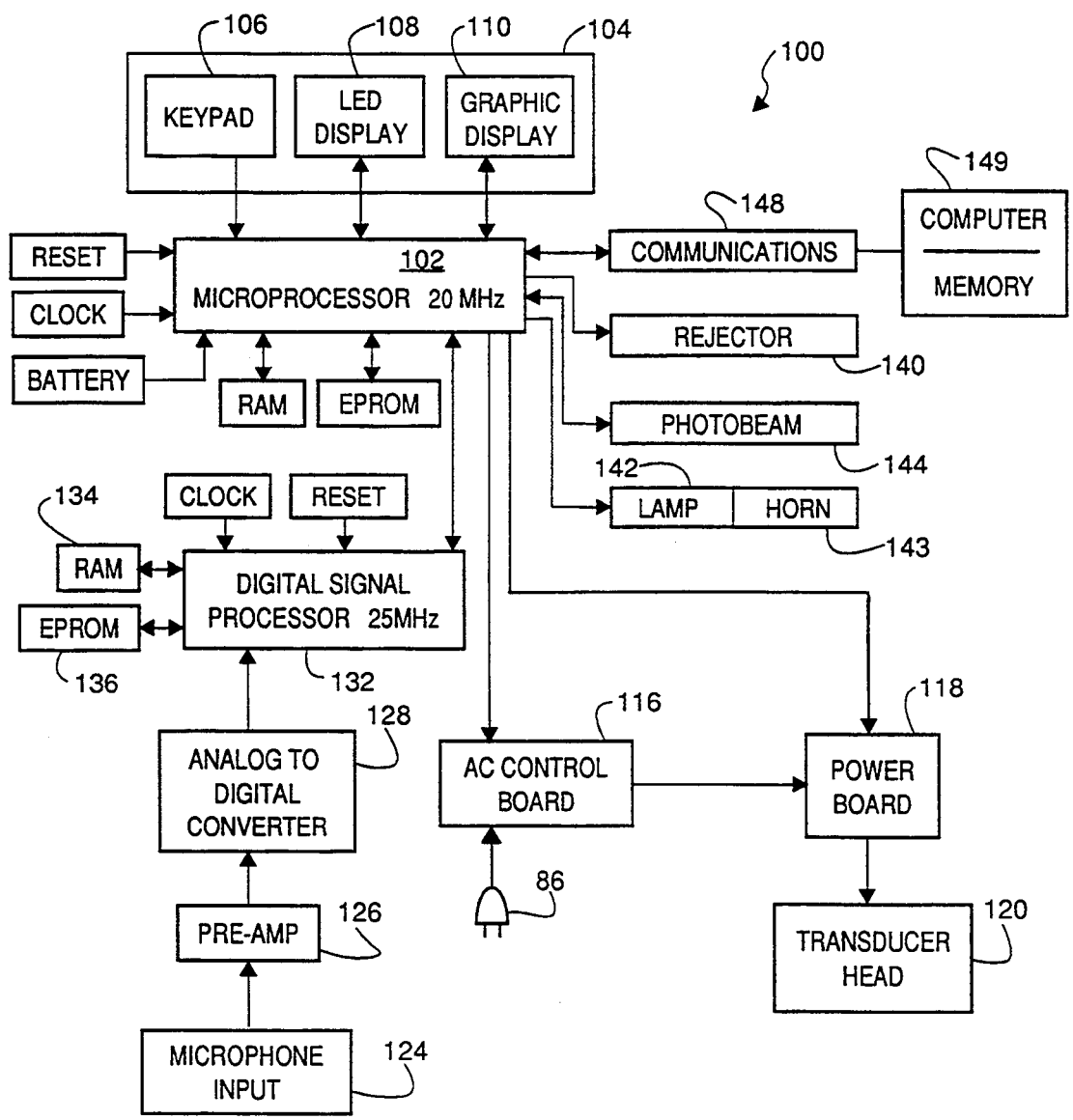
FIG. 4 is a block diagram of the control circuitry for the testing system.

Referring to FIG. 4, digital signal processor (DSP) 132 receives and analyzes the signals derived from microphone 124. The microphone provides a time-varying analog signal which is amplified by pre-amplifier 126 and converted to a digital signal by analog-digital converter 128. A single digital signal processor can be used to receive up to six microphone inputs. If multiple microphone inputs are used, a multiplexor is provided between the microphone 124 and pre-amplifier 126.

DSP 132 has two memory banks, RAM bank 132 and EPROM bank 136, which store data and which are used to convert the digital input from the time domain to the frequency domain by fast fourier transform. DSP 132, which is clocked by a 25 Mhz crystal, has more calculating power than microprocessor 102. Therefore, the DSP is used to perform the calculations and to provide a simplified indication of the result to microprocessor 102.

Microprocessor 102 (MP) controls the testing and rejecting in the system. MP 102 receives the results of the calculations from DSP 132; it then determines whether the container is properly sealed. If the container is improperly sealed, MP 102 directs rejector 140 to push the container from the line, and causes lamp 142 and horn 143 to notify the operator of a rejection. MP 102 receives both time domain and frequency domain signature information from the DSP and is capable of displaying these signatures to a user on an LCD 110 located on the user interface panel 104.

MP 102 controls testing of individual containers by receiving a signal from photobeam 144, and providing a tap signal to power board 118 to energize transducer head 120 to tap the container. Power board 118 includes a drive circuit which receives power from AC control board 116. The drive circuit has a silicon controlled rectifier (SCR) which fires in response to the tap signal from the MP. The power level of the pulse can be adjusted by the user.

Power inputs for the circuits come from AC control board 116. A relay for turning the system on and off is actuated by the user from keypad 106. There is one AC control board 116 per system, and one power board 118 per transducer. To power more than one transducer, the AC and DC power inputs from AC control board 116 are connected to an expansion bus, to which multiple power boards can be connected. Power for the system is received through plug 86.

The microprocessor also controls the user interface elements 104. MP 102 receives information and commands entered by a user on keypad 106, and provides information to the user with displays 108 and 110. A personal computer, dumb terminal, or an external storage device 149 can be used to provide information, set parameters, perform calculations, and download information through the communications ports 148, which is an RS-232 port.

Referring to FIG. 11, when the controller receives a signal on the falling edge indicating that the photobeam is blocked (230), it starts timing the container length timer (232) which records how long the photobeam is blocked. The controller decrements a tapping delay timer. When the tapping delay equals zero (234), the controller sends the tap signal to the coil causing it to fire a pulse. The controller opens communications with the DSP (238), initiates DSP activity (239), receives the data (240), and uses the information to determine whether the container passes or fails (242). If the container fails, the controller activates the rejector (248). The controller updates counters (244) and displays (246) for a pass or a fail.

Referring to FIG. 12, on the rising edge of the photobeam signal, after the container has unblocked the light beam (250), the controller records the time that the beam was blocked (252). This time is used to calculate and store a new tapping delay (254) using an infinite impulse response (IIR) digital filter. The filter has two feedback stages to reduce jitter from variations in the delay.

Referring to FIG. 13, the controller causes DSP 132 to begin collecting data by pulling the into signal active low (260). DSP 132 gathers the sampled data (262) and converts the data for the fast fourier transform (FFT) (264). The FFT is performed (266) and the results are converted to a power spectrum (268) by squaring and summing the real and imaginary parts of the transformed signal. The DSP analyzes the power spectrum (270), and returns the result to the controller (272). The result that is returned is a simplified item, such as a single number, that the controller uses to determine if the container passes or fails. The controller makes the determination, but the DSP performs the more difficult numerical calculations.

Different techniques are used by the digital signal processor to analyze the power spectrum signature (270), depending on the product and the signature type. For each technique, set-up testing is first performed to determine the characteristics of pass and fail signatures. If the system has a single frequency peak (206), the user determines a range of frequencies in which the peak should be found, within a range of frequencies to observe. A manufacturer is able to perform his own setup of the system to accommodate new products, new line speeds, and other new parameters. Referring to FIGS. 14 and 21, during set-up, a manufacturer tests a number of containers (202) with varying known pressures (i.e., both "good" and "bad" containers). The user can observe the results on the LCD screen (204). After a suitable number of containers have been observed, the user sets a high cutoff frequency 280 and a low cutoff frequency 282 (208, FIG. 21). These cutoffs confine the analysis spectrum 283. The user also selects high limit 284 and low limit 286 (210, FIG. 21) which the controller uses to define a spectrum 288 for passing containers. For each container, the DSP determines the frequency of the greatest peak within the analysis spectrum 283, and provides this information to the controller. The controller compares this frequency with the limits and cutoffs. If the frequency is within passing spectrum 288, the container passes. If the frequency is within the range 290 or 292, the controller indicates a low fail or high fail, respectively.

Referring to FIG. 15, if the signature has more than one peak (208), such as the signatures in FIGS. 9 and 10, the product is tested to identify (212) a peak of interest 295 which is used as the basis for testing. If the peak of interest is in a particular frequency range 296, and other peaks do not appear in that range (214), the product can be tested in a manner similar to the technique for a single peak signature by disregarding the other peaks.

The peak of interest can occur in a range in which another peak could appear. Referring to FIG. 16, the pressure ranges are each for passing containers, yet another peak 298 is in the range of peak of interest 297. In this case, range 300 is selected to span the peak of interest 297 and a previous peak 298. The DSP searches for the second peak in the analysis spectrum 283 (FIG. 14), and provides this information to the controller (216). The controller determines whether the second peak is within range 300. Using this technique, the second from nth peak within the range in the spectrum should also be analyzed.

Another technique is used to analyze the signature, particularly when a product exhibits non-linear pressure response from container to container so that peaks appear and disappear with different pressure, and when some peaks exhibit non-monotonic behavior. Referring to FIGS. 17 and 22, during a testing period, a number of product samples are selected to represent a range of expected variation, and samples are identified as good, bad/low, or bad/high (302). These samples are tested and the resulting signatures are stored (304) in memory as templates 314 which can be accessed by the digital signal processor.

Referring to FIG. 23, during operation, DSP 132 derives the signature (310) for an unknown sample container and compares it (312) to the templates in memory using a correlation function to determine a coefficient with respect to each template. The template with the greatest coefficient, above a certain threshold, is selected (314) as the best match 312. If this template is for a properly sealed container, the DSP provides a number or indication of a match (316), which the controller uses to determine that the container is properly sealed (318). The sample templates, i.e., the templates at pressures 1–8 (314), are also correlated among each other (306) to prevent gaps in the permissible templates.

After a product has been set-up and proper frequencies or templates have been established, information relating to properly sealed containers is stored in memory in the controller or in an external memory. If the product being tested varies among several different types, the information relating to a type that has been made is recalled from memory. Little, if any, manual adjustment, is necessary when products are changed, provided that the product has been previously tested.

The controller retrieves the information from the DSP when the DSP has finished. Referring to FIG. 18, the controller receives a signal from the DSP (320) which indicates that it has data to send. In order to synchronize the DSP and controller, the controller sends a dummy transfer through its serial peripheral interface to the DSP (322) and sets a frame_sync signal (324) which indicates that the DSP can begin to transfer data. The controller fetches the header (326), which the controller uses to determine the number of bytes and the address for the bytes (328). The controller fetches each byte and stores them, and increments the destination pointer (330) until all bytes are collected (332). When all the bytes have been fetched, the controller sets a flag indicating that all data has been received (334).

The controller operates with several timers, the quickest being 1.0 msec. Referring to FIG. 19, when the photobeam is detected (350), the controller starts the container timer (352) to measure how long it takes the container to pass. The controller also sets a flag (354) which indicates that the system is waiting to tap, and begins to decrement the tapping delay timer (356), which is based on the previous container timer counts. When the tapping delay reaches zero (358), the tap signal is sent to the coil and the INT3 interrupt signal is enabled (360). This interrupt allows the controller to receive a signal from the DSP to collect data (FIG. 18). A timeout counter is set (362) and a flag is set that the controller is waiting for the DSP to return data. When the data is uploaded (364), communications are closed with the DSP (366), and the controller determines whether the container passes or fails (FIG. 11). If the data is not uploaded, the timeout counter is decremented (370) until zero (372). When this occurs, and data has not been uploaded, a board-hung routine is called and the system is reset (374).

Referring to FIG. 20, the rejector assembly is also controlled by the 1.0 msec timer. If a reject buffer has data from the controller (380), a reject delay counter is decremented (382) until it times out at zero (384). The controller activates the rejector so that it pushes the container off the conveyor (386). A reject pulse count is set (388) and decremented to zero, at which time the rejector is retracted (392) The reject delay is compensated for line speed variations in a similar fashion to the tapping delay compensation scheme.

A separate 2.1 msec timer is used for communications polling. The controller checks the RS-232 communications port and builds input strings if data has been received, and polls the front panel keyboard to determine if a key has been depressed.

Figure 5:
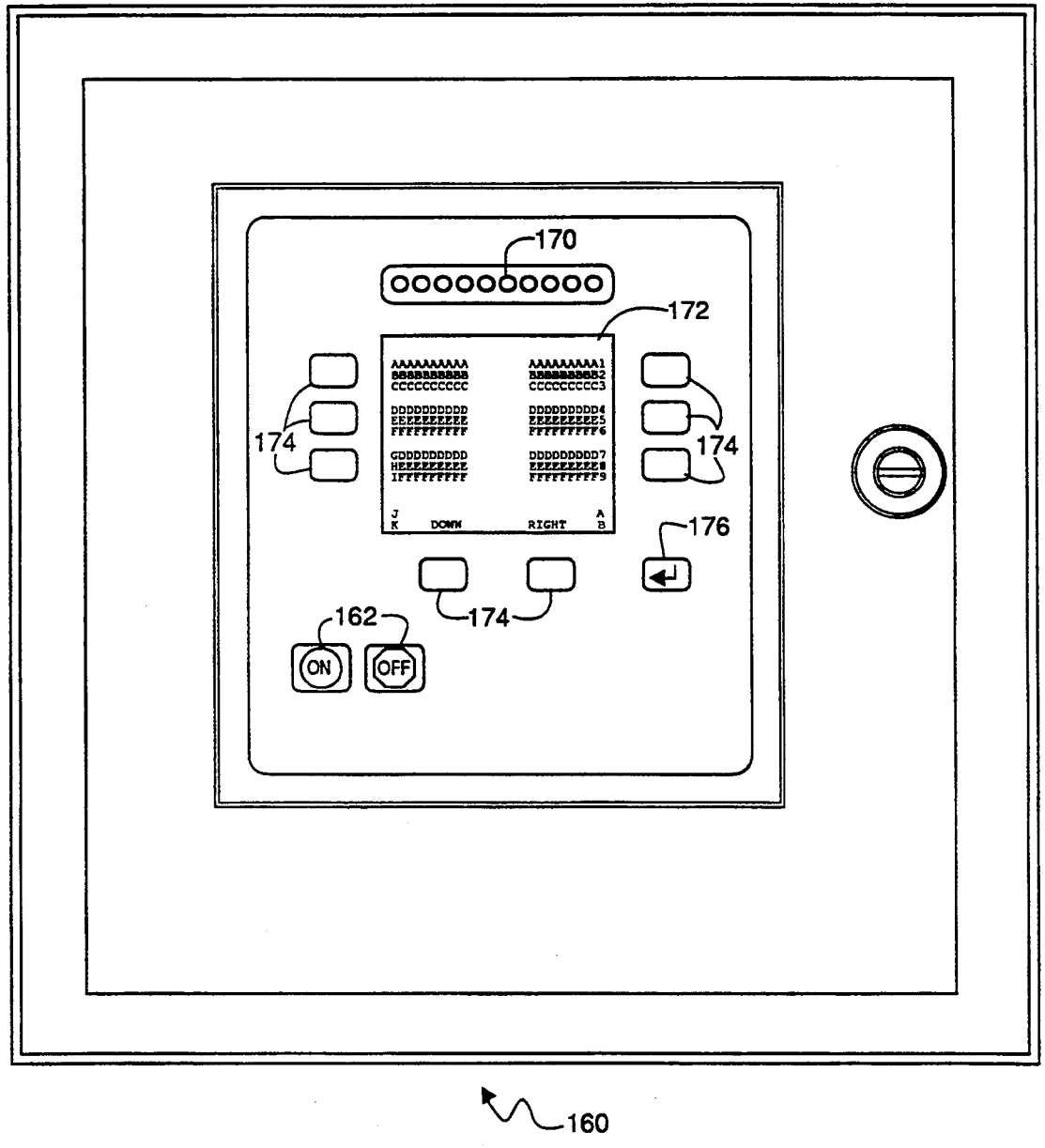
FIG. 5 is a front view of the user console.

The parameters for controlling the system, such as counters and limits, can be easily monitored and changed by a user. Referring to FIG. 5, user interface 160 has keys for controlling the system, and indicators and displays for monitoring the system. The keypad includes on and off power switches 162, soft function keys 174, and an enter key 176. LED display 170 has a row of 10 bright red LED's for displaying a relative pressure or vacuum level for each container. Graphics display 172 is an LCD graphic screen, 128 by 160 pixels, for displaying information, e.g. run time, signal spectrums, and counts of all containers or failing containers. Screen 172 also indicates the function for each soft key 174.

Referring to FIGS. 6A and 6B, when the system is powered on 196, boot-up screen 198 appears while the system performs tests. System run screen 200 next appears on the graphics display and provides information for a technician to monitor the testing system. This information includes pass/fail counts and counts of whether the failures were high or low. To proceed past this screen, a user encounters an optional password gate 202 which requires a correct password. If a correct password is entered, main menu 204 provides the authorized user with a number of control options. The menu directs the user to soft keys 174 (FIG. 5) to select options.

Counters menu 210 allows the user to reset the counts of all containers and failing containers on screen 211, and the number of high failures and low failures. System values menu 206 allows the user to observe various information, including high and low limit, power level, reject pulse, and reject delay. The low limit 215, high limit 216, and power level 217 are adjusted by the user in parameters menu 214. Other parameters are displayed on test mode menu 205 to provide the user with information to set up the system for a particular type of container. Rejector menu 208 is selected to adjust rejector timers. The reject pulse screen 209 and reject delay screen 211 allow the user to observe the delay to actuate the rejector, and to retract.

Each screen has an option to return the user to main menu screen 220. Each menu also allows the user to activate the rejector kill to disable the rejector.

Referring to FIG. 6C, communications menu 212 controls external access to the system, e.g. through a personal computer. The system can upload stored information such as signatures for properly sealed containers, and can log data by downloading information, such as counts and individual data for each container. Counters output menu 214 controls polling of the user communications features, i.e. the keypad, the RS-232 communications port, and a periodic report feature which provides absolute counts and counts over a recent period to a user from a remote source. The per container output menu allows downloading of selected information, e.g. counts of all containers or failed containers, and individual signals.

Referring to FIGS. 24-26, on the LCD panel the user can observe bar-type frequency spectra including a full-scale version (FIG. 24) or expanded forms of quadrants of the full-scale version (e.g., a first quadrant or second quandrant as in FIGS. 25 and 26).

Referring to FIGS. 27 and 28, the user may also observe a Bin Histogram showing the numbers of containers whose spectral peaks fall within various bins (FIG. 27) and a Counter Histogram showing the numbers of containers which pass, fail, fail low, and fail high (FIG. 28).

Other embodiments are within the following claims.
What is claimed is:
1. Apparatus for characterizing internal pressure of a sealed container, comprising
a tapper for causing vibration of a wall of said container,
circuitry for providing a signal indicative of a frequency spectrum of said vibration,
digital storage for holding said frequency spectrum and for holding data obtained from vibrating other sealed containers and sufficient to characterize said internal pressure based on said frequency spectrum, and
a processor for characterizing said internal pressure based on said frequency spectrum and said data.
2. The apparatus of claim 1 wherein said processor comprises means for characterizing said internal pressure based on more than one peak of said frequency spectrum.
3. The apparatus of claim 1 wherein said data held in said digital storage includes frequency spectrum information corresponding to containers having one character of internal pressure, and frequency spectrum information corresponding to containers having another character of internal pressure.
4. Apparatus for characterizing internal pressure of a series of sealed containers moving along a manufacturing line, comprising
a tapper for causing vibration of a wall of said container,
an analyzer for providing a signal indicative of a frequency spectrum of said vibration,
digital storage for holding said frequency spectrum and data sufficient to characterize said internal pressure based on said frequency spectrum, and
a processor for generating said data including
means for controlling said tapper and said analyzer to generate frequency spectra for vibrations of a series of test containers having different, known internal pressures, and
means for providing a signal indicative of said data from said frequency spectra.
5. The apparatus of claim 1 or claim 4 further comprising
storage for holding time domain data corresponding to said vibration,
circuitry for providing a signal indicative of a frequency spectrum from said time domain data, and
a display for showing a two-dimensional graphic image of said frequency spectrum.
6. The apparatus of claim 5 wherein said display comprises a liquid crystal display panel.
7. The apparatus of claim 5 wherein said graphic image comprises a bar graph.
8. Apparatus for characterizing internal pressure of a series of sealed containers moving along a manufacturing line, comprising
a tapper for characterizing the internal pressure of a sealed container when part of each said container reaches a point along said line, and
circuitry for issuing a signal when said part of said container reaches said point based on a determination of how much time elapsed while at least one prior said container in said series passed the point.
9. The apparatus of claim 8 wherein said circuitry comprises
a sensor for detecting a first time, when a portion of said container first reaches said point, and a second time, when all portions of said container have passed said point, and
a processor for determining the time difference between said first time and said second time.
10. The apparatus of claim 9 wherein said processor comprises
means for averaging said time difference with other time differences determined for other said containers in said series.
11. The apparatus of claim 9 wherein said part of said container comprises a center of said container.
12. The apparatus of claim 9 wherein said sensor comprises a photosensor.

* * * * *

UNITED STATES PATENT AND TRADEMARK OFFICE
CERTIFICATE OF CORRECTION

PATENT NO. : 5,353,631

DATED : October 11, 1994

INVENTOR(S) : Charles Woringer et al.

It is certified that error appears in the above-identified patent and that said Letters Patent is hereby corrected as shown below:

Cover page, item [56] References Cited, OTHER PUBLICATIONS, please insert the following reference: --U.E. SYSTEMS, News Release, "New Line Of Dedicated Systems For Leak Detection", July 31, 1986.

Col. 1, line 20, "ann" should be --an--.

Col. 8, line 31, after "(392)", insert a period.

Signed and Sealed this

Seventh Day of May, 1996

Attest:

BRUCE LEHMAN

Attesting Officer  Commissioner of Patents and Trademarks